United States Patent
Ressler et al.

(10) Patent No.: US 11,977,428 B1
(45) Date of Patent: May 7, 2024

(54) MOTION MEASUREMENT DEVICE AND METHODS

(71) Applicant: Diamond Kinetics, Inc., Pittsburgh, PA (US)

(72) Inventors: Michael J. Ressler, Upper St. Clair, PA (US); Jeremy M. Rittenhouse, East Earl, PA (US); William W. Clark, Wexford, PA (US)

(73) Assignee: Diamond Kinetics, Inc., Pittsburgh, PA (US)

( * ) Notice: Subject to any disclaimer, the term of this patent is extended or adjusted under 35 U.S.C. 154(b) by 50 days.

(21) Appl. No.: 17/653,473

(22) Filed: Mar. 4, 2022

Related U.S. Application Data

(60) Provisional application No. 63/156,516, filed on Mar. 4, 2021.

(51) Int. Cl.
| | |
|---|---|
| *G06F 1/32* | (2019.01) |
| *A63B 24/00* | (2006.01) |
| *G01P 15/14* | (2013.01) |
| *G06F 1/3231* | (2019.01) |

(52) U.S. Cl.
CPC ........ *G06F 1/3231* (2013.01); *A63B 24/0003* (2013.01); *A63B 24/0021* (2013.01); *G01P 15/14* (2013.01); *A63B 2220/833* (2013.01); *A63B 2220/836* (2013.01); *A63B 2225/52* (2013.01)

(58) Field of Classification Search
CPC ....................................................... G06F 1/32
See application file for complete search history.

(56) References Cited

U.S. PATENT DOCUMENTS

| | | |
|---|---|---|
| 9,694,267 B1 | 7/2017 | Thornbrue et al. |
| 9,851,374 B2 | 12/2017 | Clark et al. |
| 9,895,590 B2 | 2/2018 | Jeffery et al. |
| 10,124,230 B2 | 11/2018 | Thornbrue et al. |
| 10,286,282 B2 | 5/2019 | Ito et al. |
| 10,456,653 B2 | 10/2019 | Thornbrue et al. |

(Continued)

OTHER PUBLICATIONS

Sonnenfeld, J. et al., An Analysis of In Vivo Hip Kinematics in Elite Baseball Batters Using a Markerless Motion-Capture System, Anthroscopy, Sports Medicine, and Rehabilitation, 2021, e1-e9.

(Continued)

*Primary Examiner* — Paul B Yanchus, III
(74) *Attorney, Agent, or Firm* — Fox Rothschild LLP

(57) ABSTRACT

A system and methods for analyzing motions of items and humans who carry them are disclosed. The system a sensor configured to be connected to either a movable object or a person carrying the object. The sensor will generate data that represents movement of the object. The housing also holds a swing detection system that analyzes data generated by the sensor and identifies data representing a swing event. After determining that the data corresponds to a swing event, the swing detection system will determine whether a data transfer processor is communicatively connected to an external system. If it is connected, the swing detection system will transfer the data set to the data transfer processor for communication to the external system. Otherwise, the swing detection system will save a first copy of the data set to a temporary data storage device.

22 Claims, 20 Drawing Sheets

(56) References Cited

U.S. PATENT DOCUMENTS

| | | | |
|---|---|---|---|
| 10,888,735 B2 | 1/2021 | Clark et al. | |
| 2005/0261073 A1* | 11/2005 | Farrington, Jr. | ... A63B 69/3632 473/131 |
| 2016/0303443 A1* | 10/2016 | Boggs | .................... A63B 53/14 |
| 2023/0071908 A1* | 3/2023 | Lynch | .................... A41D 1/002 |

OTHER PUBLICATIONS

Nakano, N. et al., Evaluation of 3D Markerless Motion Capture Accuracy Using OpenPose With Multiple Video Cameras, Frontiers in Sports and Active Living, May 2020, vol. 2, Art. No. 50.
McGinnis, R. et al., A new technology for resolving the dynamics of a swinging bat, ResearchGate, Sports Engineering, Mar. 2012.
Li, Z. et al., Visibility Analysis on Swing Motion of the Golf Player Based on Kinect, Springer International Publishing AG 2017, V.G. Duffy (Ed.): DHM 2017, Part 1, LNCS 10286, pp. 115-126.

\* cited by examiner

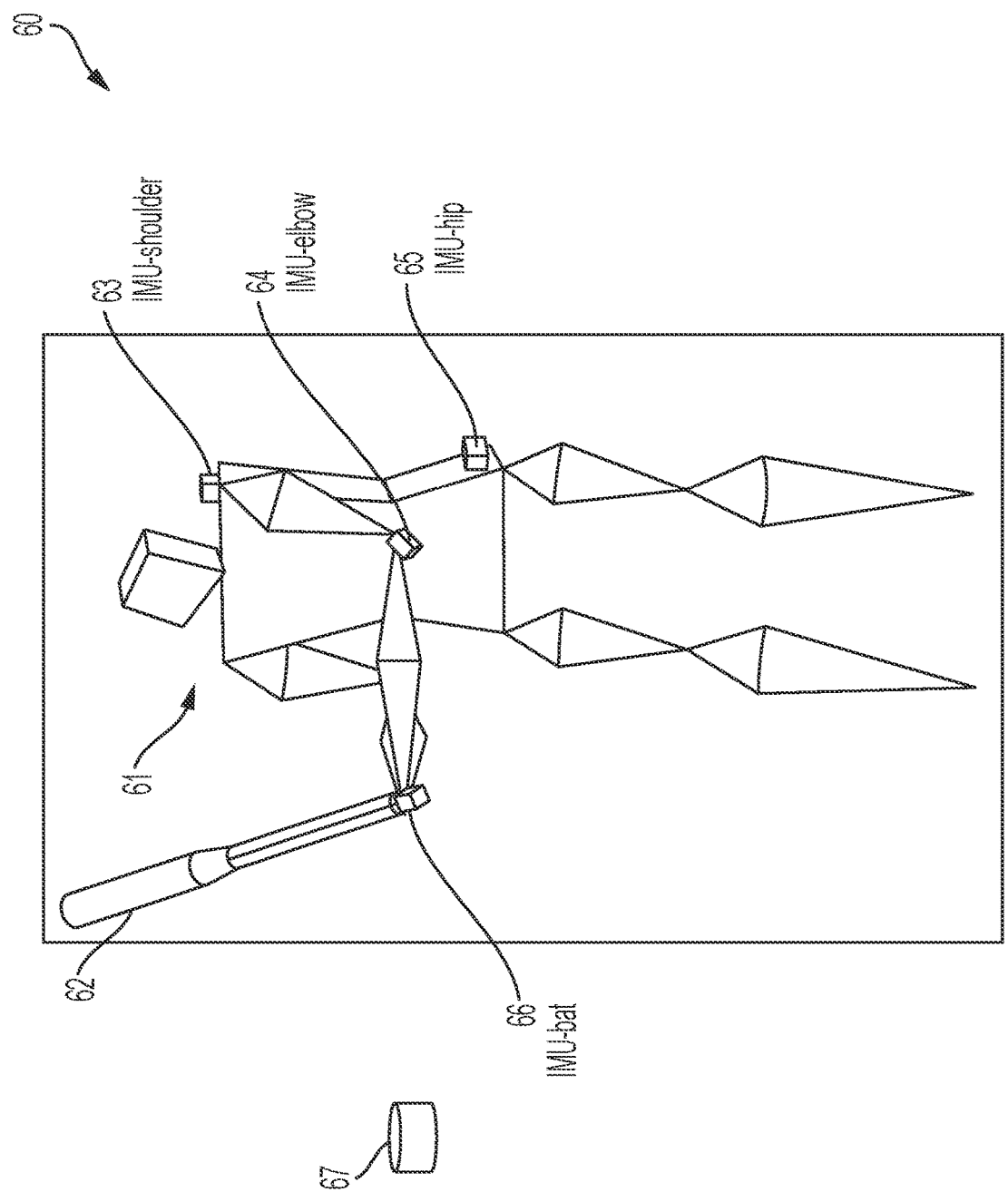

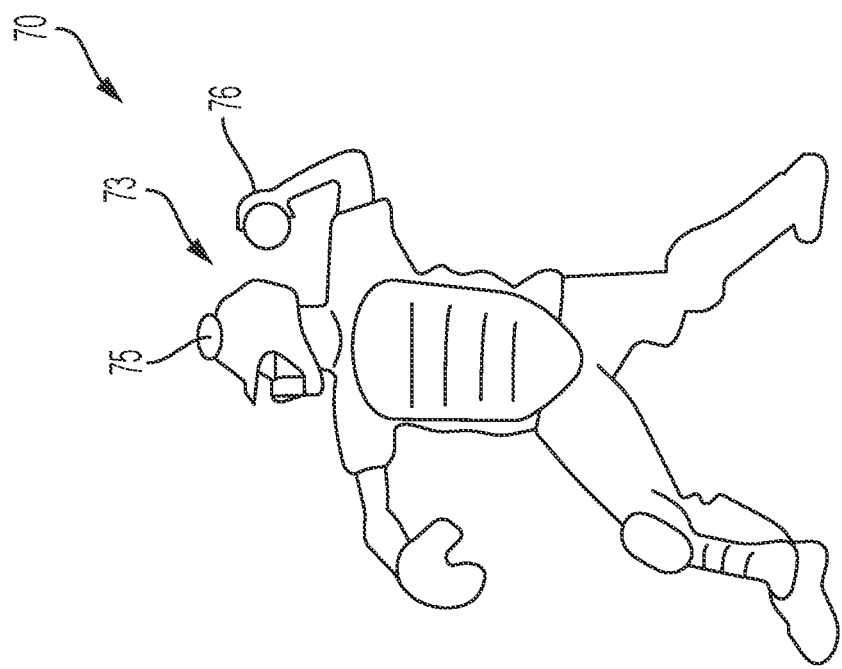
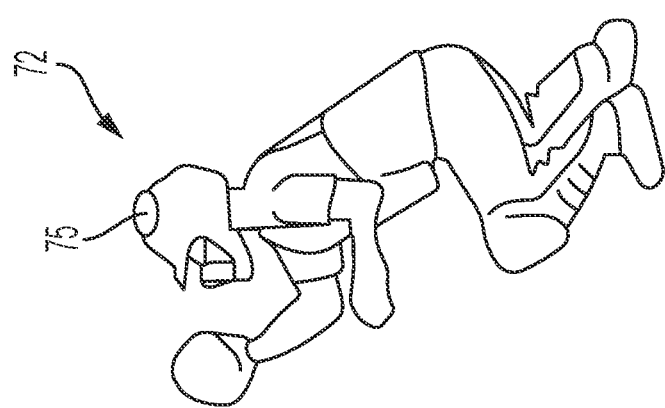
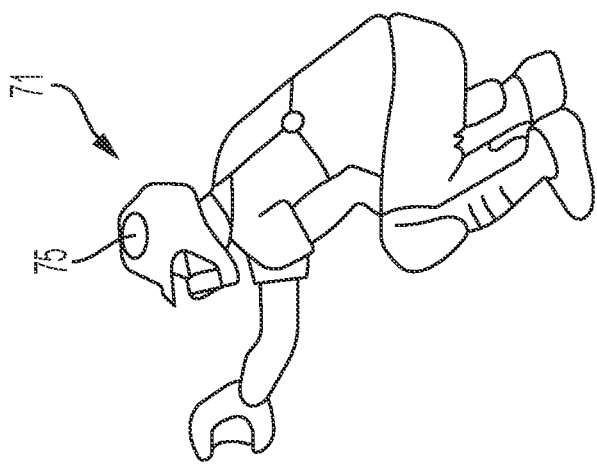
FIG. 7

MOTION MEASUREMENT DEVICE AND METHODS

RELATED APPLICATIONS AND CLAIM OF PRIORITY

This patent document claims priority to U.S. Provisional Patent Application No. 63/156,516, filed Mar. 4, 2021, the disclosure of which is fully incorporated into this document by reference.

BACKGROUND

For many years people have been interested in measuring and studying human motion, and the motion of tools and other objects used by humans. Over the past century these learnings have been dominated by the use of video cameras or relatively simple range of motion tools such as goniometers. Video capture technology has been prevalent in the past few decades, especially in medical rehabilitation and sports such as golf, baseball and softball hitting and pitching. A challenge with video capture is the lack of accurate quantitative information that may be obtained without utilizing so-called marker-based motion capture, in which optical tracking markers are placed on the subject. Such systems are typically complex, as multiple cameras are used so that the three-dimensional (3D) body segments and/or associated objects may be quantitatively tracked from the obtained video.

For example, in baseball and softball and many other sports, players and coaches have used video cameras to record a player's swing or pitch so that the player and coach could observe the player's technique and correct errors. These video-based systems are expensive and complex, which limits their use. More recently, so-called wearable sensors, such as on-bat or in-bat inertial measurement sensors, have been developed that can track and record motion data and generate feedback based on the data. Many inertial measurement sensors are commercially available today for a wide variety of human motion applications. While these systems have been effective in providing motion data that is comparable to that obtained with video analysis and more feasible in implementation (e.g., wearable devices), there are limitations in the existing inertial measurement hardware systems in terms of energy consumption and data sampling, storage, and analysis. Improvements in motion capture hardware can further benefit users not only in sports applications but in rehabilitation, occupational, defense, and other fields as well.

This document describes methods and systems that are designed to address some or all the issues mentioned above.

SUMMARY

A system for monitoring motion of a movable item is described. The system includes a housing that contains a non-volatile data storage device, a data transfer processor, and a sensor. In some embodiments, the data storage device may be a temporary data storage device. The sensor is configured to be connected to either (a) a movable object or (b) a person who is carrying the movable object. The sensor will generate data that represents movement of the movable object. The housing also holds a swing detection system that is programmed to analyze the data generated by the sensor and identify, in the data, a data set representing a swing event. After determining that the data set corresponds to a swing event, the swing detection system will determine whether the data transfer processor is communicatively connected to an external system. If the data transfer processor is communicatively connected to the external system, the swing detection system will transfer the data set to a location via which the data transfer processor may receive the data set for communication to the external system. Otherwise, the swing detection system will save a first copy of the data set to the non-volatile data storage device.

Optionally, the swing detection system may include a first processor and programming instructions configured to cause the first processor to: (a) receive the data generated by the sensor; (b) identify, in the data, a data set representing a potential swing event; and (c) transfer the data set to a location where a second processor may receive the data. The system also may include the second processor and programming instructions to cause the second processor to (x) receive, from the first processor, the data set representing the potential swing event, and (y) analyze the data set to determine whether the data set corresponds to an actual swing event.

In some embodiments, the location to which the data is transferred is a direct communication path. In others, the system may include a volatile memory, and the location via which the first processor may transfer the data set to the second processor, and/or the location or via which the system transfers data to the data transfer processor, is not a direct path but an indirect path in which the data is transferred to the volatile memory for retrieval by the destination processor. The destination processor may then retrieve the data set from the volatile memory.

In some embodiments, the sensor comprises a transducer that is configured to generate the data that represents movement of the movable object, along with a circuit that is electrically connected to the transducer, wherein the circuit comprises a finite state machine. The swing detection system is implemented by the finite state machine, in which the circuit will: (a) monitor the data that represents movement as the data that represents movement is generated by the transducer; (b) detect a swing event in the data that represents movement; and (c) change state when the circuit detects a swing event.

In some embodiments, the swing detection system is further programmed to, upon determining that the data transfer processor is communicatively connected to an external system, transfer data to the external system. Optionally, to transfer the data set to the location, the system may transfer the data set to a volatile memory. The data transfer processor may then retrieve the data set from the volatile memory and transfer the data set to a transceiver for transmission to the external system.

In some embodiments, swing detection system may be configured to compute metrics from the swing data. Upon the swing detection system determining that the data transfer processor is communicatively connected to an external system, the data transfer preparation processor may transfer data to the external system.

In some embodiments, the system includes instructions configured to cause the swing detection system to, after detecting a swing event and before determining whether the data transfer processor is communicatively connected to an external system, transfer swing event data to a queue of a memory device. In some embodiments, the swing detection system includes a data analysis processor that is configured to analyze the data generated by the sensor and identify the data set representing a swing event. Optionally, the data analysis processor may be in a first power domain, and the data transfer processor may be a second power domain. The system also may include a first processor that is configured to, upon identification of the potential swing event in the data, generate a wake signal and transfer the wake signal to the data analysis processor. The data analysis processor may be configured to change from sleep mode to a wake mode in response to receipt of the wake signal. Alternatively, the first processor may send an interrupt to a power domain controller that in turn sends a wake signal to the data analysis processor. In addition, the first processor may be configured to remain in a sleep mode until receipt of a wake signal from a transducer, or from the power domain controller after it receives and interrupt from a transducer. Further, the data transfer processor may be configured to, upon determination that the data set corresponds to an actual swing event, generate an interrupt signal and transfer the interrupt signal to the data transfer processor. The data transfer processor may then be configured to change from sleep mode to a wake mode in response to receipt of the interrupt signal. Alternatively, the data transfer processor may send an interrupt signal to the power domain controller, which in turn derives a wake signal from the interrupt signal and sends the wake signal to the data transfer processor.

BRIEF DESCRIPTION OF THE DRAWINGS

FIGS. 6A and 6B illustrate a swing analysis system using multiple motion sensors connected to the player's body and bat.

FIG. 7 shows a sequence of catcher motion events including receiving a pitch and completing a throw.

DETAILED DESCRIPTION

Figure 1:
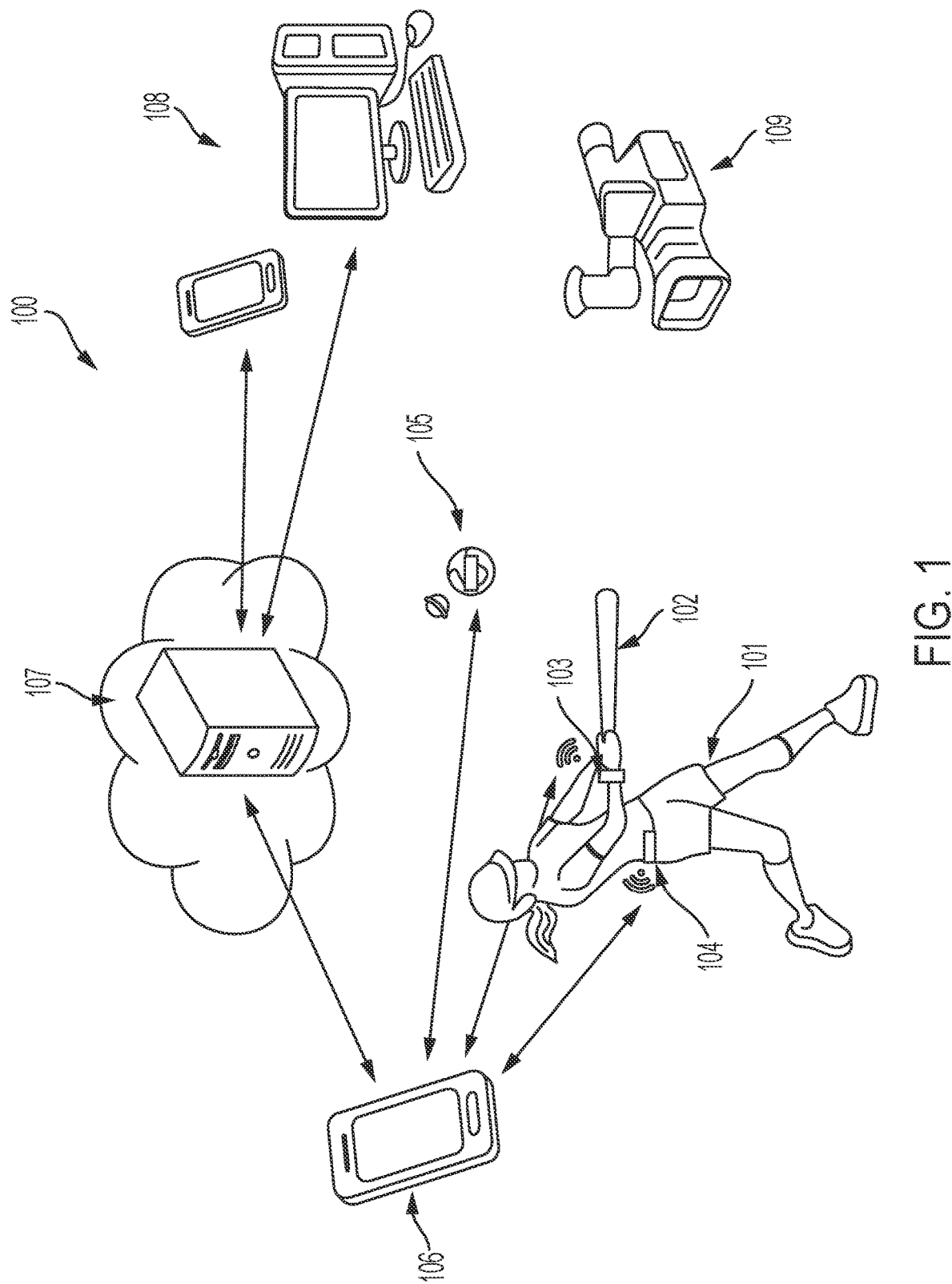
FIG. 1 illustrates a schematic of an example system in which motion measurement devices may be used in conjunction with other components.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such "first" and "second" are used to modify a noun, such use is simply intended to distinguish one item from another, and is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

When used in this document, terms such as "top" and "bottom," "upper" and "lower", or "front" and "rear," are not intended to have absolute orientations but are instead intended to describe relative positions of various components with respect to each other. For example, a first component may be an "upper" component and a second component may be a "lower" component when a device of which the components are a part is oriented in a first direction. The relative orientations of the components may be reversed, or the components may be on the same plane, if the orientation of the structure that contains the components is changed. The claims are intended to include all orientations of a device containing such components.

Additional terms that are relevant to this disclosure are defined at the end of this Detailed Description section.

Referring initially to the drawings, FIG. 1 illustrates an example system 100 for sports motion analysis and feedback generation. The player 101 is depicted as a baseball or softball player swinging a movable object 102. In the example shown, movable object 102 is a softball or baseball bat. However, the system may be used in any activity in which a person swings a movable object to hit a ball or other target, not only including a player swinging a bat but also a tennis player swinging a racket, a golfer swinging a club, a carpenter swinging a hammer, a painter moving a brush, or other individuals moving other tools or sporting goods in relation to an object or target. In the discussion below, when the term "bat" is used it is intended to include any such movable object. The system may also be used when no tool is involved, such as for analyzing motions of the person only, for instance a runner, dancer, baseball player, tennis player, or a person performing activities of daily living or occupation. This description will use the term "player" or "batter" or "pitcher" to refer to any person that is the subject of motion analysis, and this description will use the term "bat" or "ball" to refer to the object that the person may be using or interacting with. However, it is to be understood that this disclosure is not limited to bats and baseball or softball players.

In the system of FIG. 1, the bat 102 includes an embedded or attached motion sensor 103 that includes hardware for measuring the motion of the bat during the player's swing. The motion sensor 103 is described in more detail herein but may include any microelectromechanical, piezoelectric, or radio wave transducers whose data may be analyzed to determine the movement of the sensor and by way of association to the body to which it is attached. For example, the sensor may include individual or a combination of single or multiple-axis accelerometers, gyroscopes, magnetometers, radio-frequency sensors, and/or inertial measurement units (IMUs). Optionally, the motion sensor 103 may have an onboard processing device and memory so that the sensor also serves as a computing device and/or data storage device. Alternative or additional motion sensors may be included as shown in FIG. 1, such as sensor 104 attached to the player's body. The sensor(s) 103 (and 104) also may communicate wirelessly or through wires with each other, and may include or be connected to a transmitter for sending and/or receiving instructions and information about its operation and/or for transmitting data collected and/or analysis results to a computing device 106 such as a laptop computer, desktop computer, tablet computer, mobile phone, or smartwatch or other computing device via one or more wired or wireless communication networks, or by direct transmission using near-field or short-range communication technology. The computing device 106 may carry out further computation on the data received from the sensor(s) and may transfer the original data or computed results, meta data, or combinations to server 107 by way of a wired or wireless network. Alternatively, the sensor may simply gather data and transmit the data to the server 107 and/or computing device 106.

Optionally, in addition or as an alternative to the motion tracking sensor(s) 103, 104, the system may include a camera 109 that is positioned to capture digital video (a sequence of digital images) of the player 101 and the bat 102 as the player 101 is swinging the bat 102. The camera 109 also may include a transmitter via which it can transmit its captured data to the computing device 106 and/or to the server 107. Alternatively, the optional camera 109 may be part of the computing device 106, such as the camera on a mobile phone or tablet computer. The camera may be used to capture movement of the player's body during the swing. The body movement information, for example movement of individual body segments or coordination of body segments during the swing, may also be considered as part of the player's motion analysis. Calculations of the player's body motions such as position and orientation of body segments or joints and/or derivatives of those quantities with respect to time, may be captured in conjunction with or synchronized in time with the bat motion. In addition, for the case of a moving target such as a ball, the ball motion in three-dimensional space may be captured by video or other means in conjunction with or synchronized in time with the bat motion.

Optionally, in addition to or as an alternative to the motion tracking sensor and/or camera, the system may derive data about the player motion and the swing from other sensors, such as force plates under the player's feet, force or torque sensors in the bat handle, strain gauges on the bat, near-field proximity sensors, ultra-wideband position and motion sensors, and other wearable sensors.

The system also may include a target 105 (such as a ball) toward which the player will swing the bat and try to contact the target. The target may be moving or stationary, and it may incorporate a motion sensor (attached or embedded). The target 105 may be a real, physical target in some embodiments. Alternatively, if the player 101 is wearing a virtual reality (VR) or augmented reality (AR) media player that places a display in front of the player's eyes, the target may be a virtual target that is output on the display of the media player.

The system such as that described in FIG. 1 above may be used to measure the motions of a player's swing or throw, and groups of such data may be aggregated or otherwise analyzed in combination to create a model of the player's swing or throw such that the player's characteristics or trends may be studied, improved, and/or compared to other players. The results of such analysis may be used to guide the player to understand, gain insights about, and to improve his or her swing or throw, or to learn better game strategy related to his or her swing or throw. In this document, the term "swing event" will be used to refer to a motion in which a person either (a) swings a movable object such as a bat, racket or tool, or (b) swings their arm to throw a movable object such as a ball.

Figure 2:
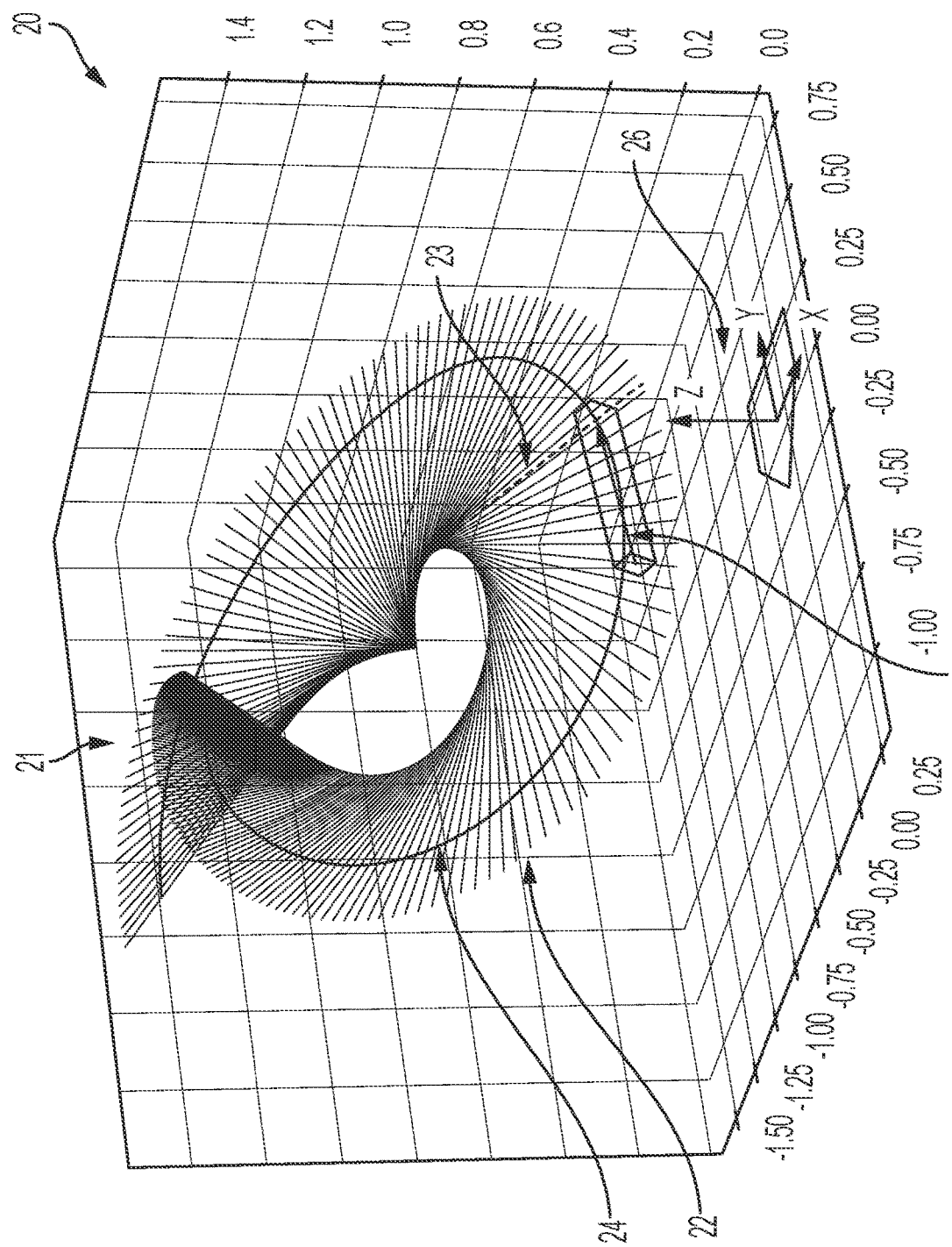
FIG. 2 illustrates an example visual representation of a player's swing that the system of FIG. 1 may capture.

FIG. 2 illustrates an example visualization 20 of a swing event that may be derived from the motion capture data captured in the system shown in FIG. 1. The image in FIG. 2 shows a three-dimensional representation of the path 21 of a bat swung by a player. Other motions may be similarly represented, such as ball motion or player body segment motion, or combinations of any of these. Line segments 22 indicate the bat position and orientation in space at discrete points in time during the swing. Line 23 indicates a particular point of interest, such as the nearest bat position shown to when contact occurs between the bat and ball. Curved line 24 shows the path of some point of interest on the bat, such as a point along the length of the bat at a predetermined distance from the knob. This point may be the same point on every bat or unique to each bat or group of bats, or it may be defined as the same distance along the bat's length for every bat, or some distance along the length that is specific to each bat or bat model or group of bats, such as softball bats and baseball bats or youth bats or wood bats or a particular team's bats. Arrow 25 shows an example characteristic of the swing of interest to the player, which is the direction of motion of the barrel of the bat immediately prior to impact. Many different metrics of interest may be derived from the swing motion diagram 21, for example maximum barrel speed of the bat, trigger-to-impact time, or elevation angle of the bat before impact. Likewise, many other meaningful metrics may be obtained from the motion data and displayed for the user's benefit, such as impact momentum of the bat or maximum acceleration of a point on the bat.

The swing trajectory may be plotted in relation to a coordinate system located in the frame of the field or court or facility in which the game is played. For example, the field frame coordinate system 26 has an origin that may be arbitrarily placed at a fixed location, such as the center of home plate, and may be defined to have an orientation as shown in FIG. 2 with the Y-axis pointed in the direction from the catcher to the pitcher on a baseball field, the X-axis pointed perpendicular to Y from one batter's box to the other, and the Z-axis pointed upwards in opposition to gravity. In order to graphically depict information about the bat swing motion, one may calculate that information from the sensor data. In particular, one may wish to know the locations, orientations, and velocities of the bat itself as it moves in 3-dimensional space (as depicted in FIG. 2), or one may wish to know timing or other metrics of the bat or player motion as they are related to the motion of other objects.

Figure 3:
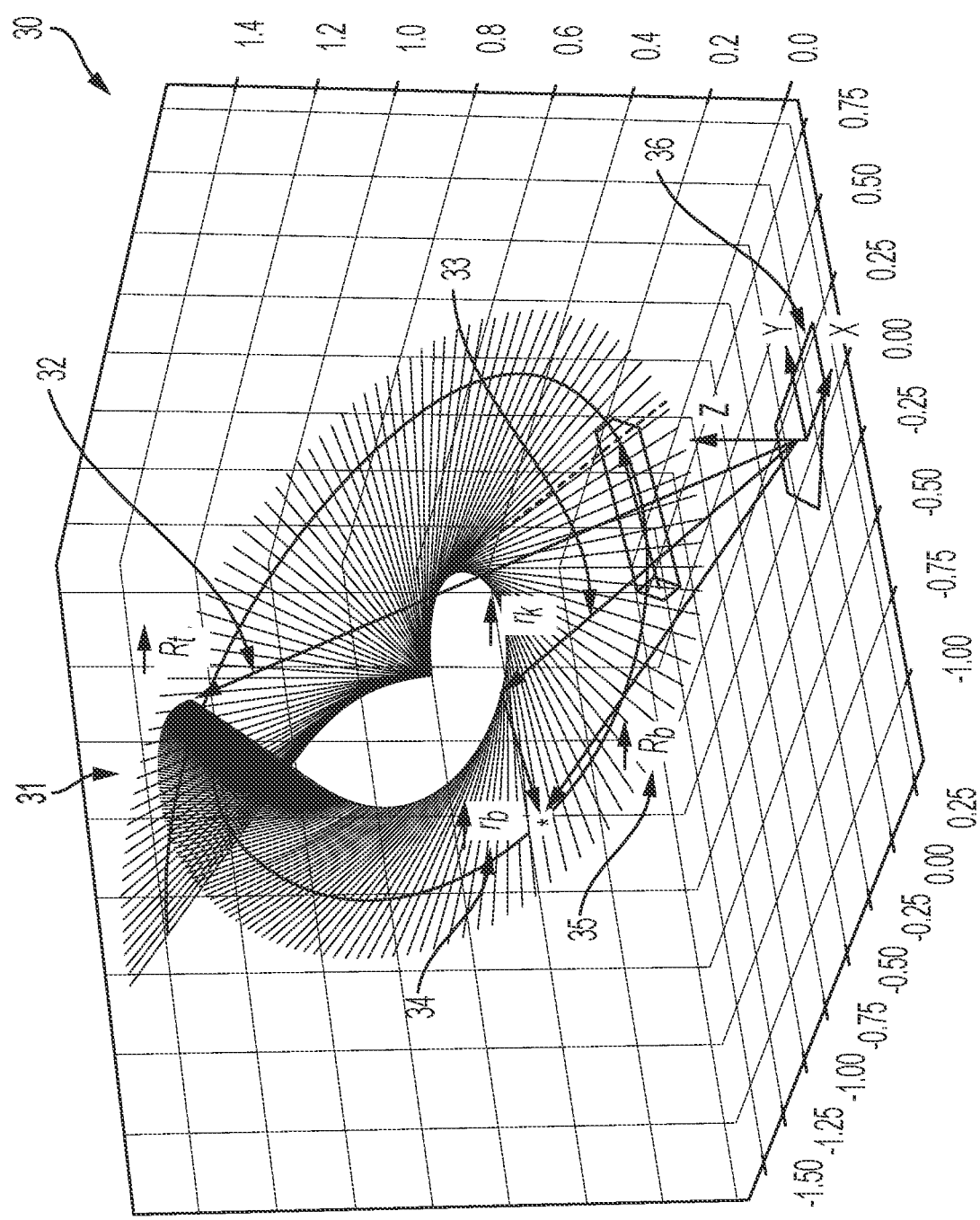
FIG. 3 illustrates an example visual representation of a player's swing that the system of FIG. 1 may capture with vectors shown that locate key points of interest in the 3-dimensional field frame.

FIG. 3 further illustrates an example of how the bat movement may be represented graphically, with a three-dimensional (3D) visualization of a swing 30 and graphical depiction of bat trajectory during a swing 31. As in FIG. 2, the field frame is defined by coordinate axes X-Y-Z 36 located at the origin of the coordinate system. Any point in the swing trajectory may be defined by a vector from the field frame origin. For example, vector $\vec{R}_t$ 32 shows the position of the tip of the bat in the field frame at the beginning of the swing. Also shown in FIG. 3 is vector combination $\vec{r}_k$ 33 and $\vec{r}_b$ 34 which form vector $\vec{R}_b$ 35 as $\vec{R}_b = \vec{r}_k + \vec{r}_b$ and which shows the location of some point of interest on the bat in the field frame at an arbitrary time during the swing. Vector $\vec{r}_k$ 33 describes the location of the knob of the bat at that instant in time, and vector $\vec{r}_b$ 34 is directed along the length of the bat. Addition of those two vectors enables the determination of the point of interest in the field frame.

The bat position and orientation at an instant in time may be calculated from measured data from the sensor(s) in FIG. 1. For example, FIG. 3 shows vector $\vec{r}_k$ 33, which defines the calculated location of the knob of the bat at some point in time during the swing, which could be the time of impact with the ball. The vector $\vec{r}_k$ may be defined as $\vec{r}_k = a\hat{i} + b\hat{j} + c\hat{k}$ where $\hat{i}, \hat{j}$, and $\hat{k}$ are unit vectors in the X, Y, and Z directions, respectively, and a, b, and c are scalar distances that define the location of the end of that vector relative to its origin, along the three coordinate axes. In this manner, vector $\vec{r}_k$ defines the location of the knob of the bat in 3-dimensional space at the desired instant during the swing. Vector $\hat{r}_b$ 34 likewise represents the location of some point on the bat in 3-dimensional space, and it may be defined as $\vec{r}_b = d\hat{i} + r\hat{j} + f\hat{k}$ where d, e, and f are scalar distances that likewise define the location of the end of that vector relative to its origin, along the three coordinate axes. Vector $\hat{r}_b$ may also be defined as $\hat{r}_b = d1\hat{l} + e2\hat{m} + f1\hat{k}$ where $\hat{l}, \hat{m}$, and $\hat{n}$ are unit vectors in the bat frame and d1, e2, and f1 are scalar distances in that frame. In other words, the vector $\hat{r}_b$ in the field frame (X-Y-Z) may be determined by first defining it in the bat frame $(x_b-y_b-z_b$ where, for example, one axis is along the centerline of the bat and the other axes are perpendicular to the centerline) and then rotated to the field frame using a coordinate rotation matrix defined by calculation from the sensor data. Since the origin of vector $\vec{r}_b$ is placed at the end of $\vec{r}_k$ (the knob of the bat in this example), then vector $\vec{r}_b$ points along the length of the bat. Therefore, the vector sum $\vec{r}_k + \vec{r}_b$, which is represented in FIG. 3 as vector $\vec{R}_b$ 35, defines the location of some point along the length of the bat in 3-dimensional space, or $$\vec{r}_b + \vec{r}_b = (a\hat{i} + b\hat{j} + c\hat{k}) + (d\hat{i} + e\hat{j} + f\hat{k}) = (a+d)\hat{i} + (b+e)\hat{j} + (c+f)\hat{k}$$

Knowing or assuming the location of the batter, using measured information or inferring from features in the swing, for example the load position as described in U.S. Pat. No. 10,888,735 to Clark et. al., titled "Calibration of Initial Orientation and Position of Sports Equipment and Body Segments for Inertial Sensors" (the disclosure of which is fully incorporated into this document by reference), one can relate the bat trajectory information and any other locational information about the swing with respect to the player or home plate. Measured data is used by known methods to calculate sequential sensor location and orientation, and therefore bat location and orientation due to the rigid connection between sensor and bat.

Alternatively, data used for calculating the trajectories shown in FIG. 2 and FIG. 3 may be obtained by analyzing video captured by the one or more cameras, using any suitable method such as known methods in the literature, or one may use a combination of motion tracking sensor data and camera images to determine the path and motion of the bat. Similar techniques may be used to obtain motion and orientation information about position, movement, and coordination of player body segments and joints or ball position and movement from motion tracking sensors, camera data, or both.

Figure 4:
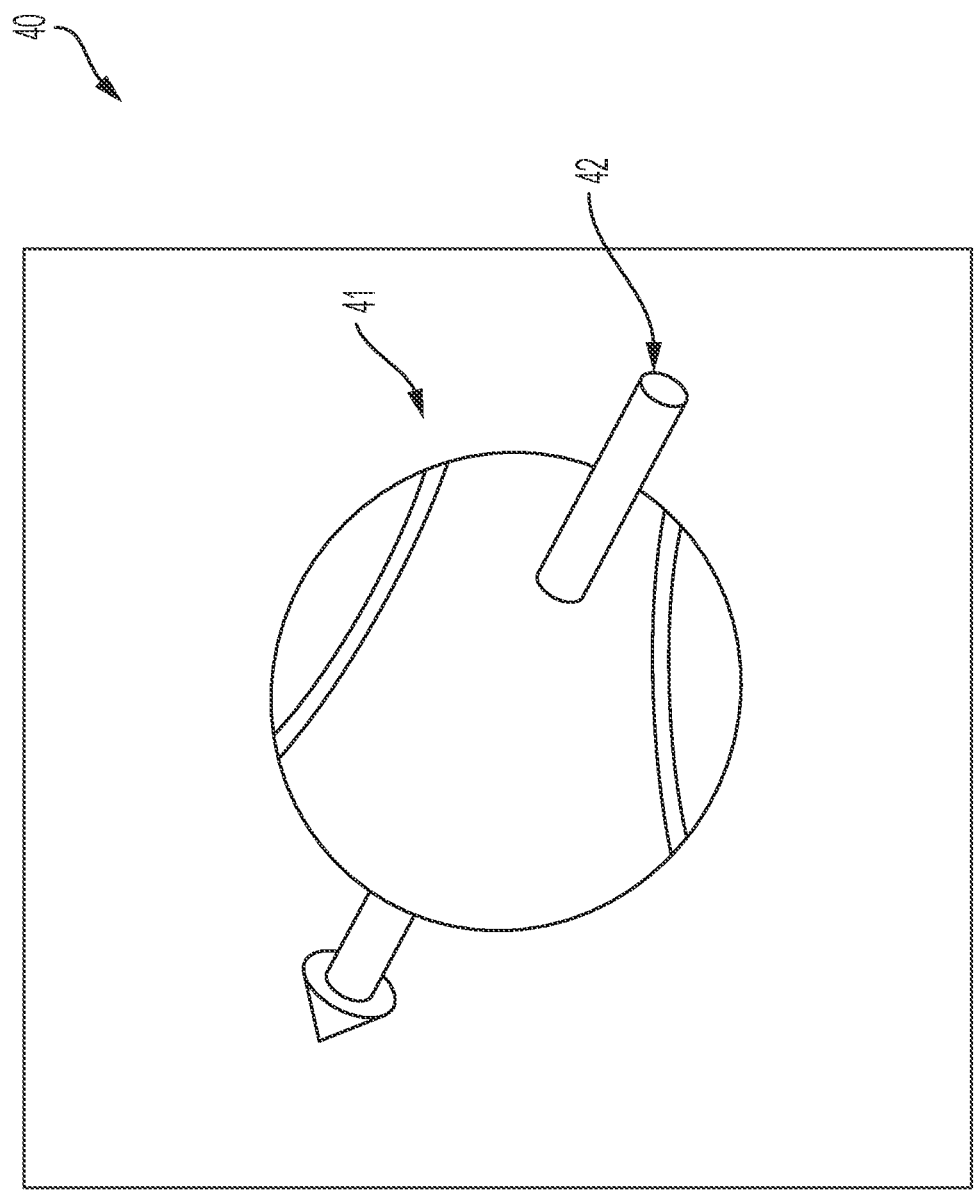
FIG. 4 shows an example of information that may be displayed related to motion of a pitched ball based on measured data.

An alternative application for using sensor data is shown in FIG. 4 which shows a softball in free flight after being released by a pitcher 40. Superimposed on the ball 41 is an arrow 42 that depicts the ball's spin axis and direction of spin of the ball during flight. This information is useful to the pitcher to hone their pitching skills, and may be derived from the motion data measured using devices and methods described in this disclosure. Similarly, motion of the ball during the full pitching motion and flight may be determined for use by the player.

An example method for collecting data, with respect to this disclosure, is to obtain the player and/or object motions by analysis of inertial sensor or other sensor data using well-known computational algorithms. The sensor's motion (position and orientation and associated derivatives) can be determined in three-dimensional space from, for example, measured acceleration, angular velocity, and/or magnetic field versus time using the motion tracking sensor. Since the sensor is fixed to the bat and both bat and sensor move as a rigid body throughout the swing, sensor motion in space can be projected to motion of any point on the bat or other rigid body to which the sensor is attached by well-known kinematics analyses. In addition, one can use inverse dynamics analysis to calculate from measured information and known or approximate bat mass properties the forces and torques that were imparted to the bat versus time to create the motions.

Figure 5:
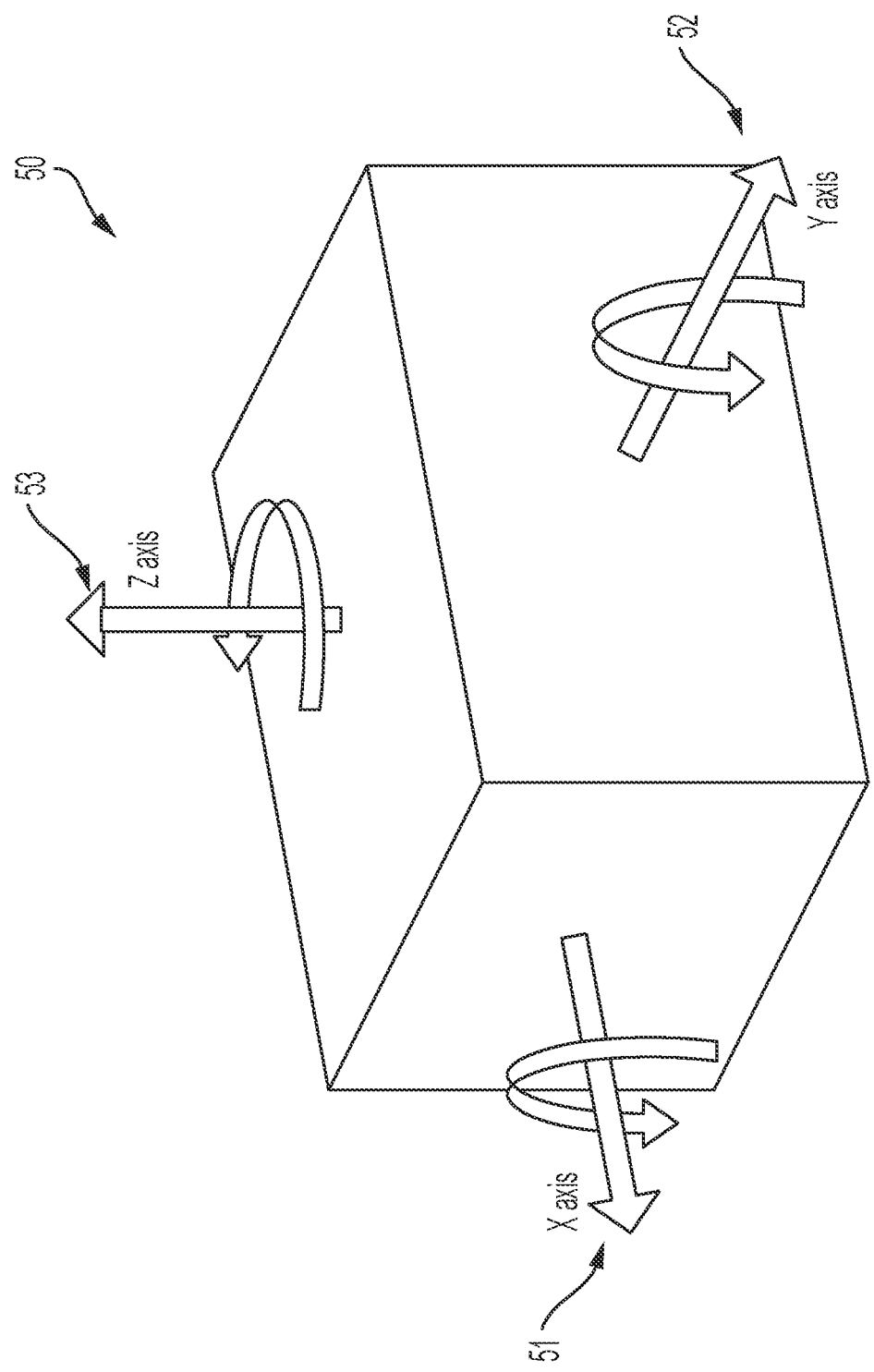
FIG. 5 illustrates a schematic of an inertial measurement sensor and the corresponding axes of motion for which measurements may be made.

FIG. 5 illustrates a representation of an inertial sensor 50 that is of interest to this disclosure. In particular, FIG. 5 shows a sensor housing three sensor-fixed axes (51, 52, 53) for which independent measurements may be made with the inertial sensor. Inertial measurement involves the use of some combination of transducers (such as accelerometers which measure linear acceleration, angular rate gyroscopes which measure angular velocity, and magnetometers which measure ambient magnetic field, and or inertial measurement units which include combinations of these features) to obtain accurate information about the motion of a body to which the sensors are attached. Various combinations of transducers may be incorporated into a single sensing unit. In this disclosure the actual sensing element that converts a physical quantity (e.g., acceleration) into data (e.g., voltage or digital information) will be referred to as a transducer. Transducers may measure information in a single axis or in multiple axes. A combination of transducers, along with other electronics, in a single housing will be referred to as a sensor or pod. Many transducers may be incorporated into a sensor (for example, one or more triple-axis accelerometer transducer, one or more triple-axis angular rate gyro, and one or more triple-axis magnetometer) and the transducers may be packaged together (in a single integrated circuit) or separately (connected on a printed circuit board or on separate but connected circuit boards). The transducers may be oriented in the pod such that their axes of measurement coincide with each other, or they may be oriented with different alignments. Other transducers may be included in a sensor, such as near-field proximity transducers, temperature transducers, pressure transducers, and many others.

As is known in rigid body dynamics literature, when a sensor is rigidly connected to an object, such as a baseball bat, a ball, or a segment of a player's body, and the accompanying transducers are rigidly connected to/within the sensor, then the measurements of the transducers correspond to the motion of both the transducers and the object to which they are attached. For example, acceleration experienced by the accelerometer is equal to the acceleration experienced by the body to which the accelerometer is attached at the point of attachment if the body itself were extended to include that point (in other words, the rigid connection of the sensor and body means that the sensor acts as an extension of the body, and therefore the body and the sensor move as one). Motion of other points on the body may be determined by simple and known kinematic relations. FIG. 6A shows an application 60 that includes a hitter 61 and bat 62 with multiple motion sensors attached to segments of their body (e.g., at the shoulder 63, elbow 64, hip 65, etc.) and to the bat 66. An individual sensor may be connected directly to the skin, or may be secured in a glove (e.g., a batting glove), a strap, a wristband, or other removable clothing or device. For equipment, the sensor may be removably connected to or may be permanently embedded within the object of interest. Also shown is a receiving and processing unit 67 that may be similar to and/or used similarly to computing device 106 in FIG. 1.

Figure 6B:
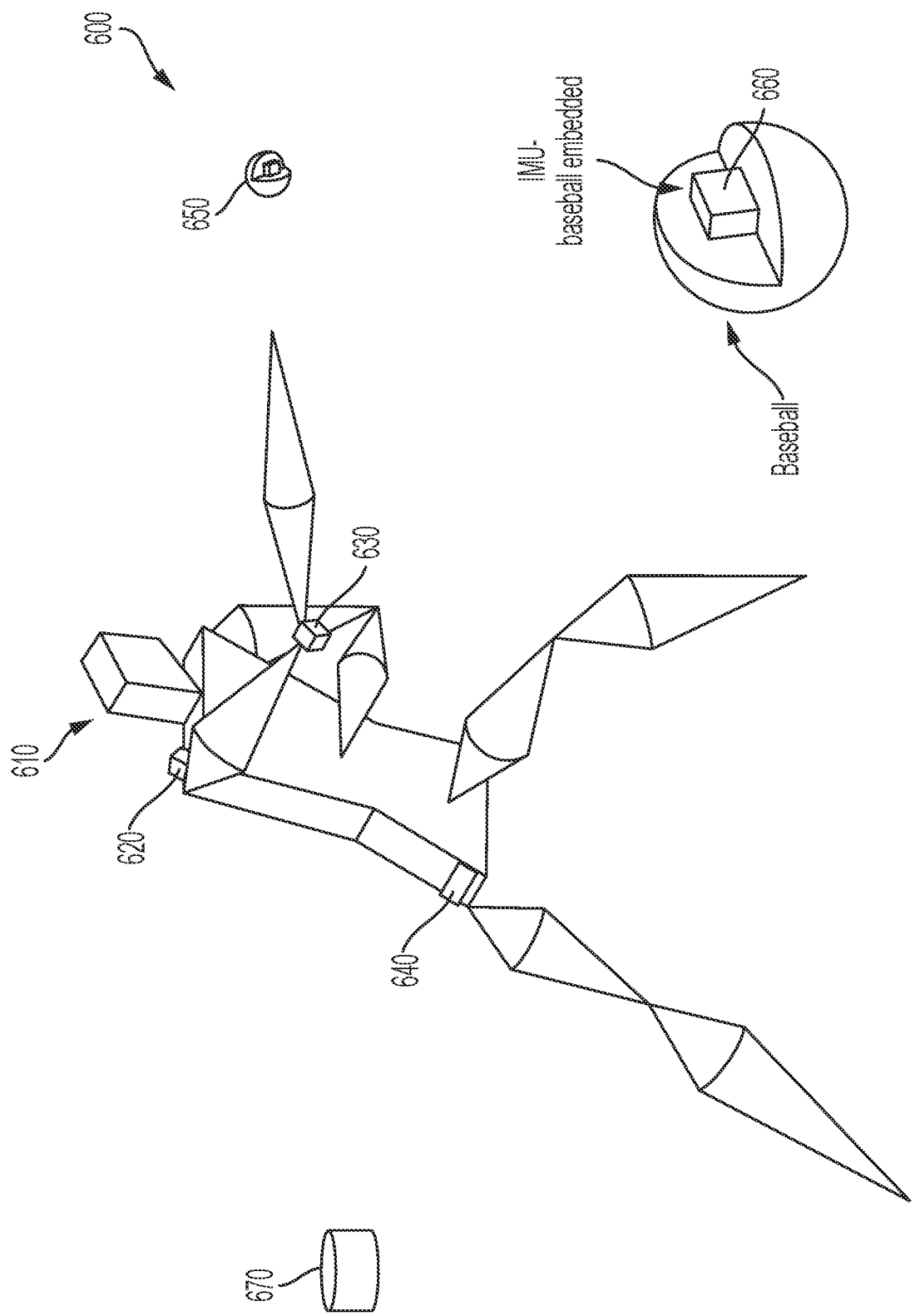

FIG. 6B shows another application 600 such as a pitcher or fielder 610 with multiple motion sensors attached to segments of the player's body (e.g. shoulder 620, elbow 630, and hip 640), and to the ball 650. The sensor 660 may be embedded within the ball. Also shown is a receiving and processing unit 670 that may be similar to and/or used similarly to computing device 106 in FIG. 1.

FIG. 7 shows an application in which one or more sensors 75 are connected to a position player, in this case a catcher. This figure shows a sequence of movements 70 by a catcher as he receives and throws a ball 767. The sensor(s) 75 may be attached to the player's body, equipment or clothing that the player is wearing (such as a helmet or padding) and/or in the ball 76 that is being caught and thrown. A useful application of interest is measuring the timing or specific motion patterns of the player as a throwing movement or fielding movement is executed. For example, the player may use a ball 76 that contains an embedded sensor, such as a sensor described in this disclosure. The ball 76 may be used to measure the timing of a catcher's throwing motion, such as the time to catch a pitch and throw a runner out who is trying to steal a base, which is often referred to as the "pop time". In each of these situations, for the purpose of the disclosure the movement of the player's arm to throw a ball or catch a ball, as detected by the associated movement of the ball that contains a sensor, will be considered to be a "swing event".

A sensor-enabled ball 76 may be thrown by a coach or player to the catcher, who is in a normal receiving position 71 as depicted in FIG. 7. The catcher receives the ball 72 and proceeds to complete a throw 73. Using known calculation methods, the data received by the sensor may be used to calculate the motions of the ball 76 as the catcher receives and completes the throw, including the flight of the ball to another receiving player (not shown in FIG. 7) such as a fielder at second base who will receive the throw and tag the runner who is trying to steal the base. The sensor data collected in the ball may also be used to measure the timing of the total throw by the catcher (for example the duration from the time the catcher receives the pitch to the time the fielder receives the catcher's throw which is the accepted definition of pop time), or individual segments of the throwing motion such as time from receiving the ball to cocking the arm or time from receiving the ball to release of the throw. The pop time may be determined by spikes in the data. For example, when the ball first strikes the catcher's mitt, transducers in the sensor such as accelerometers or rate gyros will indicate a large change in measured value. Likewise, a spike will occur when the fielder receives the catcher's throw. The timing of these spikes, which can be accurately measured within the sensor, may be used to determine the pop time, for example the elapsed time between spikes.

The measured data from the pitch, catch, throwing motion, ball flight, and subsequent catch, and/or portions thereof, or measured time points or durations of these events may be transmitted to a computing device 106 (as in FIG. 1) for interpretation and use by a player or coach or other observer. It is noted that pop time or other relevant times associated with the catcher's motion may be determined using sensors other than a sensor within a ball, such as sensors on the catcher's glove, the fielder's glove, or a body part such as the hand or wrist of one or more players. Likewise, many other fielding motions may be measured in similar manner, such as throwing motions or timing of other players, such as an outfielder catching a ball and throwing to another player, or an infielder receiving and throwing a ball.

The sensors shown in FIGS. 6A, 6B and 7 may be communicatively connected, either wirelessly or wired, so that data may be shared between them. Alternatively the sensors may be communicatively connected, either wirelessly or wired, to a processing unit (106, 67, or 670) that receives data and optionally controls the sensor operations. The sensors may share a time base such that data is periodically synchronized or the data may be collected and synchronized after the fact.

Figure 8:
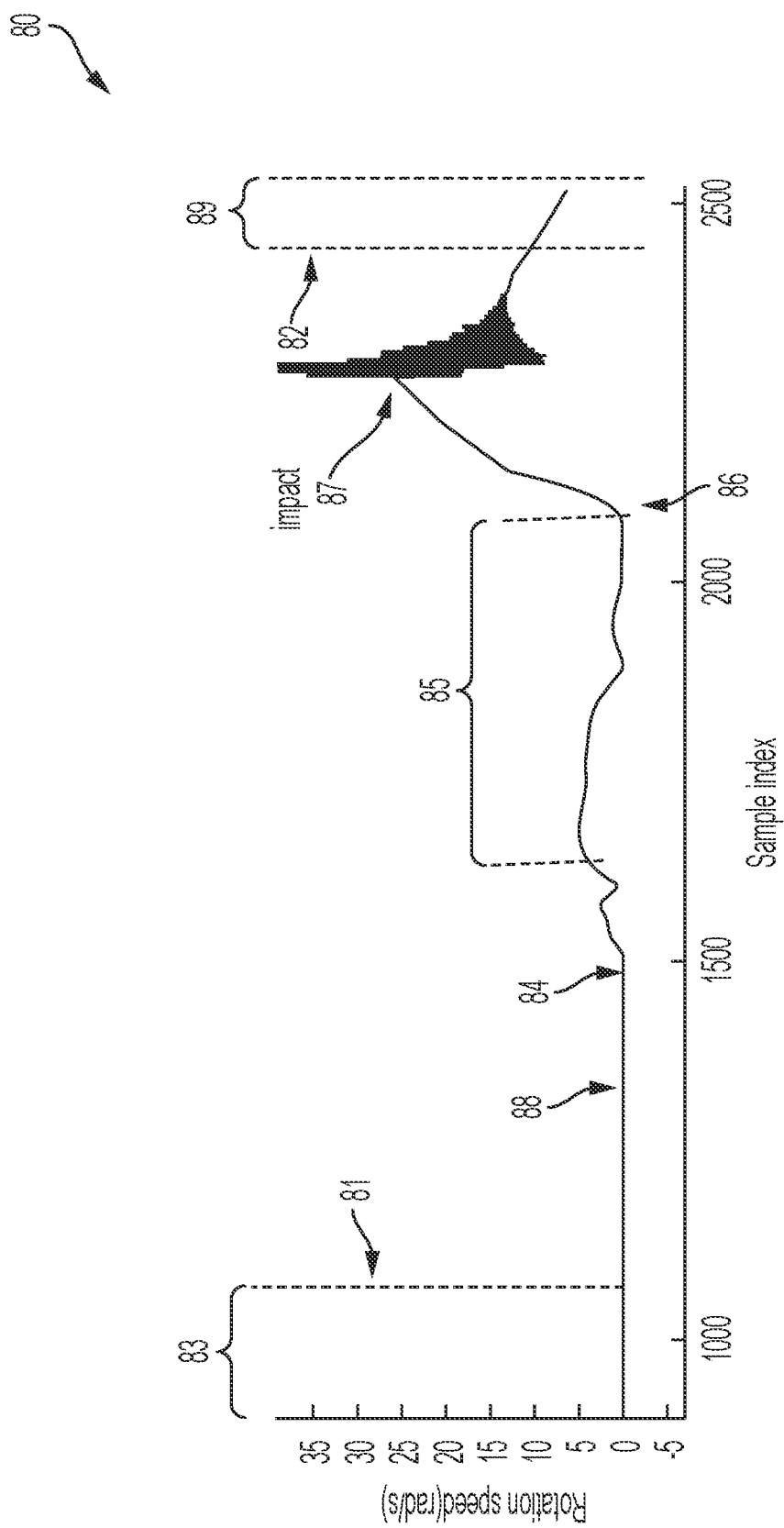
FIG. 8 illustrates example data captured from the motion tracking sensor during a swing with multiple key timepoints denoted.

FIG. 8 illustrates an example of a plot of data 80 that may be obtained from one or more transducers in the sensor. Note that the time points (sometimes called time stamps) are often included in the saved data as well as the numerical information of the data itself. The data shown is rotation speed, and this data may be obtained from a single axis of the angular rate gyroscope or other motion sensor. (Note that the data has been transformed into units of rad/sec for interpretation but may be received in original form in another set of units such as Volts, bits, revolutions per minute (RPM), etc., or units from another sensor such as m/s$^2$, Gauss, etc.) but is representative of any of the transducers in the sensor. In this example, the sensor is attached to a bat that is swung by the player. The data varies as the swing progresses, and impact of the ball and bat can generally be determined from an abrupt change in the data at the instant of impact, as illustrated in the figure. The data shown in FIG. 8 depicts a motion event (a full swing in this case) plus additional data before and after the swing, for illustration purposes. Key time points are shown in FIG. 8, including the initial time point 81 and the final time point 82 of the event of interest (e.g. the swing event), pre-event data 83 or post-event data 89 that can be discarded before and after the event, a time point 84 for beginning of numerical integration, a period of pre-event data (e.g. pre-swing motion of the bat) 85, the start of the swing event 86, the time instant of impact 87, and a point of estimating a position and/or orientation of the bat 88. Depending on the application of interest, these key time points may differ from what is shown, may not exist, or may coincide with one another, but it is understood that any motion application will have key time points of interest.

In some embodiments the system may collect data from some or all sensors during the motion event, and then use the set of synchronized data to compute information about the event, such as the swing trajectory shown in FIG. 2 and FIG. 3 or specific information related to the swing trajectory.

These calculations may be done on a processor that is different than one incorporated into the sensor, such as on computing device 106 (of FIG. 1) or a server 107 connected to a communication network such as the internet. There are situations in which it is advantageous to perform calculations on all or portions of the data on the sensor itself. For example, filtering of the data to reduce noise or to estimate true values in the presence of noise (e.g. low-pass filtering, Kalman filtering, particle filtering), identifying key time points in a motion event such as those shown in FIG. 8 (e.g. pauses in motion, key time points for time-integration of data, impact time), down-sampling of data, or carrying out continual computation of some motion characteristic such as position or orientation in the fixed-frame, among others. In addition to these needs, one may be mindful of the energy consumed by the sensor electronics as higher energy consumption per time requires a larger battery to be used or more frequent charging or replacement of the battery. The present innovation addresses these issues.

Figure 9:
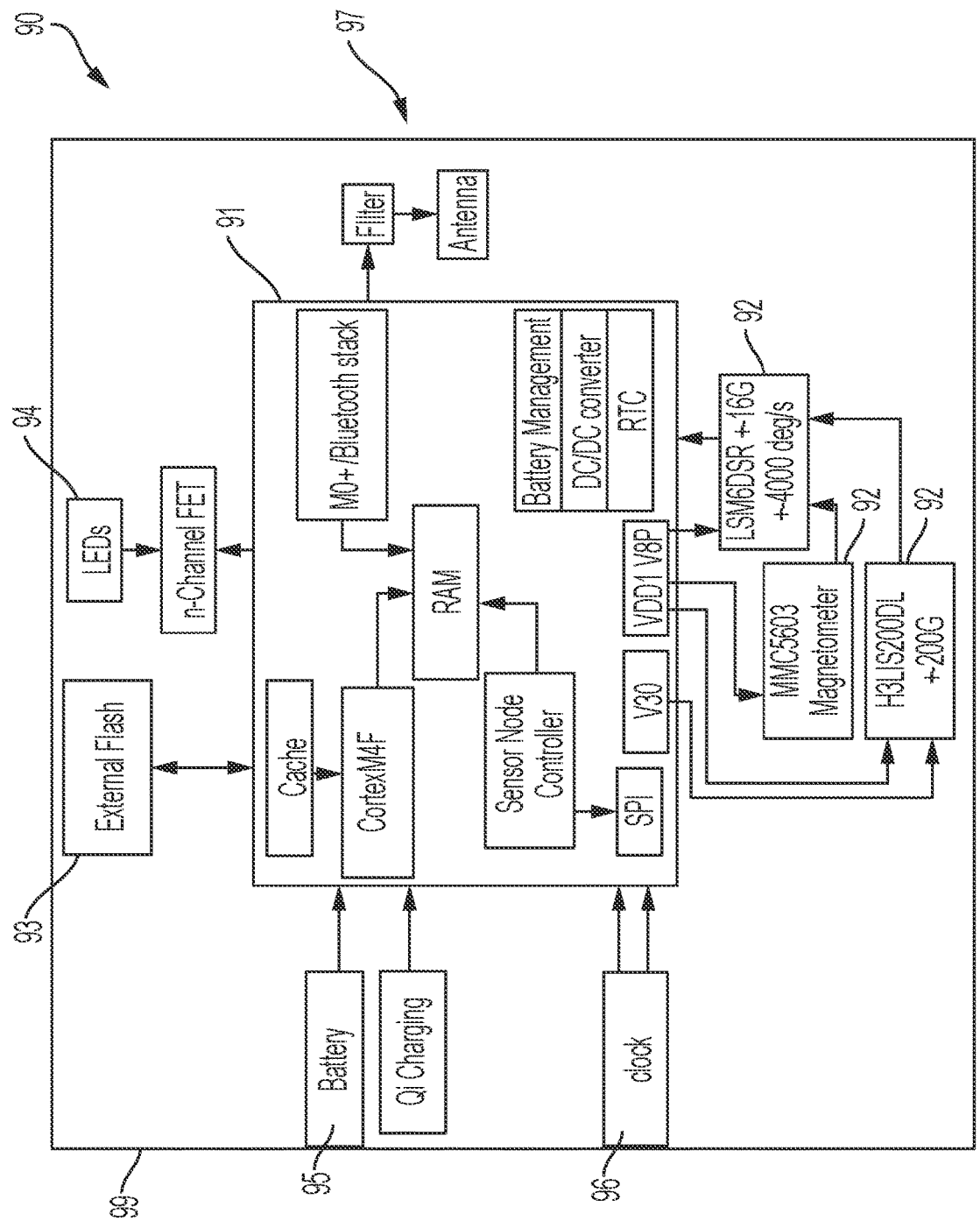
FIG. 9 illustrates a schematic of example architecture of motion sensor electronics that is the subject of the innovation.

FIG. 9 shows an example of sensor electronics that can address the challenges described above. While the circuitry shown in FIG. 9 is an example embodiment of sensor architecture for this disclosure, there are many variations that may have optimized performance for different goals, for example reduced energy consumption or increased computation ability, and some of the components may be omitted. The full architecture shown in FIG. 9 is integrated, for example on a printed circuit board, and housed into a housing structure 99, such as a plastic container that may be connected to a bat in any of various ways, such as to the knob of the bat 102 as shown in FIG. 1. Alternatively, the electronics and printed circuit board may be embedded into a bat or a ball such that it may not be readily removed, for example in the ball 76 shown in FIG. 7. Furthermore, the electronics may be integrated into a flexible or conformable substrate such that it conforms to the inner surface of the object to which it is embedded, for example the inside of the handle of a baseball bat.

The architecture 90 of FIG. 9 illustrates functional components of a system-on-chip (SoC) processing device 91 and its relationship to other components in the sensor. For example, the Dialog DA14695 SoC is an example processing device 91 architecture that may be used in the present innovation that has multiple processors that may be used to optimize performance as well as provide accompanying wireless communication capability. The SoC is an integrated circuit that includes a set of processors, controllers, memory, and a radio transceiver. The SoC or related multi-core microcontroller unit will be communicatively coupled to various components to make up the complete motion sensor. Transducers 92 such as (i) an inertial measurement unit (IMU) (such as the STMicroelectronics LSM6DSR), which includes a triple-axis accelerometer and a triple-axis angular rate gyroscope; (ii) a triple-axis magnetometer (such as the STMicroelectronics LIS2DML and MEMSIC MMC5603); and (iii) a triple-axis accelerometer (such as the STMicroelectronics H3LIS200DL). The actual transducers used in an embodiment may differ from that shown in FIG. 9. The transducers 92 may incorporate Finite State Machines (FSM) that facilitate data sampling and analysis. The sensor architecture may incorporate flash memory or other type of non-volatile memory 93, light-emitting diodes 94 and associated power electronics, a battery (95 which may be a variety of types, such as lithium polymer or other chemistry or physical makeups) and/or associated charging electronics 905, one or more crystal oscillator clock circuits 96, and an antenna 97 for wireless communication along with an optional filter 907, via which certain components of the SoC may communicate with external computing devices. These elements may all be included in a housing that will be attached to or embedded within a baseball or softball bat.

Figure 10:
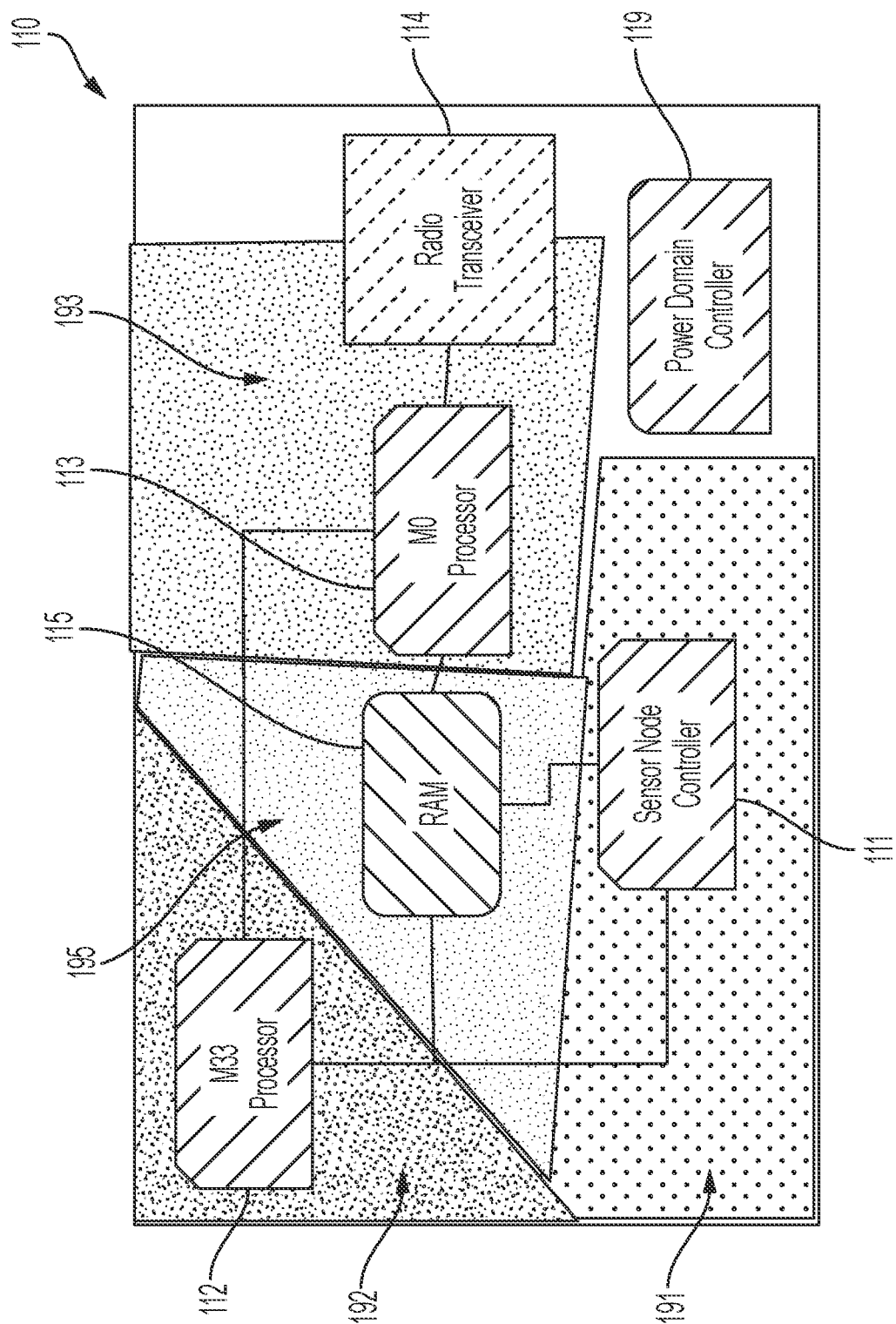
FIG. 10 shows an example functional architecture of a multi-core processor that may be used in a sensor.

When the bat is swung, the SoC's processors can collect data from the device's sensors and determine whether the data is that of a swing. If the data appears to represent a swing, the device can store the data or send the data to an external computing device (such as computing device 106 or server 107 of FIG. 1) for further processing. FIG. 10 shows an example SoC microcontroller unit architecture 110 (for the DA14695 SoC in the example shown) in more detail, although other multi-core processor systems may accomplish the innovations described herein. Many details of the architecture are omitted in FIG. 10 for simplicity. The SoC shown includes multiple processors, including: (i) a first processor 111, which in this example is a sensor node controller (SNC) that runs autonomously and independently processes data from the transducers connected to its interfaces; (ii) a second processor 112, which in this example is an Arm® Cortex® M33 microcontroller but which could be a different type of microcontroller or microprocessor; (iii) a third processor 113, in this example is an Arm® Cortex® M0 processor, that handles communication functions with external devices; and (iv) a power domain controller (Power Management Unit, not shown) that controls the various different processing cores on the device and only activates them as needed. As will be described below, the first processor 111 performs functions of data handling from the transducers and event detection, the second processor 112 performs data analysis and transfer preparation functions, while the third processor 113 functions to transfer data to external systems.

All processors may communicate with the power domain controller 119 to be awoken from sleep mode or to cause another processor to awake from sleep mode to perform a function. For example, the first processor 111, upon recognition of a possible swing event in the data, may send a signal to the power domain controller to wake the second processor 112 for further analysis of the data. Likewise, the second processor 112 may communicate with the power domain controller 119 to wake the third processor to transfer data to an external system. Alternatively, the various processors may be configured to communicate wake signals directly between each other. In addition, components outside of the processing architecture 110 of FIG. 10 may communicate with the power domain controller 119. For example, one or more transducers 92 may send an interrupt signal to the power domain controller 119, causing the power domain controller 119 to send a signal to the first processor 111 to wake and analyze the data.

The SoC architecture 110 or related unit also includes a radio transceiver 114, flash memory (not shown), and a temporary data storage device such as random access memory (RAM) 115, which is a type of volatile memory device. Each component in the microcontroller unit architecture 110 may be communicatively coupled so that data and instructions may be shared among them.

An example workflow by which the system may capture motion data is described below. A swing event to be captured (e.g., a swing of a bat or pitch of a ball) can happen asynchronously with the sensor electronics. That is, the sensor may not be aware of when a swing may occur, so it must monitor motions constantly and recognize when an event has occurred that is to be captured. Note that the sensor may be allowed to sleep or otherwise enter a low-power state when the motion is stopped or very near to zero. Otherwise, when motions occur that are not at or near zero (e.g., above some acceleration or angular rate threshold(s)) then the sensor may be alerted (as can be done through interrupt signals inherent in the transducer electronics) and placed into a mode in which it continually monitors the data to recognize motions of interest. To minimize energy consumption and to offload processing requirements from a given processor, the continual monitoring of data may be done in the architecture shown in FIG. 10 by an alternate processor of the Sensor Node Controller (SNC) 113 or by a Finite State Machine (FSM) in one or more of the transducers.

The first processor 111 (SNC) may receive data from the transducers 92 and transfer it to the system RAM 115. The first processor 111 may also wake the second processor 112, either directly or by way of the power domain controller, at appropriate times when data is available to be analyzed. The first processor 111 can have a compact instruction set that allows handling of parallel input/output (PIO)-based interrupts from transducers, or that allows for polling sensor status bits, comparing register to memory values, and transferring data from the sensors to system RAM 115. The first processor 111 may or may not utilize the RAM 115 while analyzing the data. The first processor 111 may require minimal (i.e., a very low amount of) current. In this manner, the full functionality of the multi-core sensor architecture is available but since most of the time is spent analyzing data that is not associated with an event, this architecture minimizes energy consumption.

In this example, the second processor 112 processes sensor data to determine whether the sensed data represents a swing (or other appropriate event motion). It can also be used upon power-up to initialize the register configuration in the transducers. The second processor 112 could be designed to directly receive the data from the transducers but does not in this example. Instead, when the first processor 111, either directly or by way of the power domain controller 119, signals the second processor 112 that possible swing event data is available, the second processor 112 may retrieve the data from RAM 115 and process the data to determine whether the data contains information pertaining to a swing event. If the data pertains to a swing event, the second processor 112 may, either directly or by way of the power domain controller, send an interrupt signal to the third processor 113, which may inform the second processor 112 whether an external computing device is available to receive the data. The second processor 112 may send the interrupt signal to the third processor 113 via a high-performance bus (AHB), and it may or may not be configured to send event data or processed event data to the third processor 113. The third processor 113 may be configured to retrieve data from RAM 115 for transmission. If a computing device is available, the second processor 112 may transfer the data to the data transfer processor (third processor 113) or to the system's RAM 115 where third processor 113 may retrieve it. Otherwise, if a computing device is not available, the second processor 112 may transfer the data to the sensor's external flash or other memory 93 to be held until an external computing device is available to receive the data. To prepare data for transfer to the external system the second processor 112 may compress and "wrap" the sensor data into single-swing packages, or packages that correspond to a time period, before storing the data in either the RAM 115 or the external memory 93.

In this workflow the second processor 112 will not directly send any data to any external computing device, but instead will merely save the data to one of the system's memories. This permits the second processor 112 to conserve power and processing capability for other tasks, while leaving communication functions to other components of the system.

The third processor 113 can have one function: to serve as a data transfer processor by controlling data flow to an external receiving device, such as the computing device 106 via the radio transceiver 114. The third processor 113 can receive signals from a computing device when such a device is within range and available to connect.

When the third processor 113 receives an interrupt signal from the second processor 112 or from the power domain controller 119, if the external computing device 106 is available, the third processor 113 can extract the data from the RAM 115 and pass the data to the radio transceiver 114 (which may include antenna 97 of FIG. 9), and the radio transceiver 114 can transmit the data to the external computing device. If the external computing device is not available, the third processor 113 can inform the second processor 112, and the second processor 112 can place the data in a non-volatile memory 93 such as flash memory for storage until the external computing device becomes available. When the computing device becomes available, the second processor 111 can extract the data from non-volatile memory 93 and transfer it to the RAM 115, and third second processor 113 can then extract the data from the RAM 115 and pass the data to the external device via the radio transceiver 114.

Figure 11:
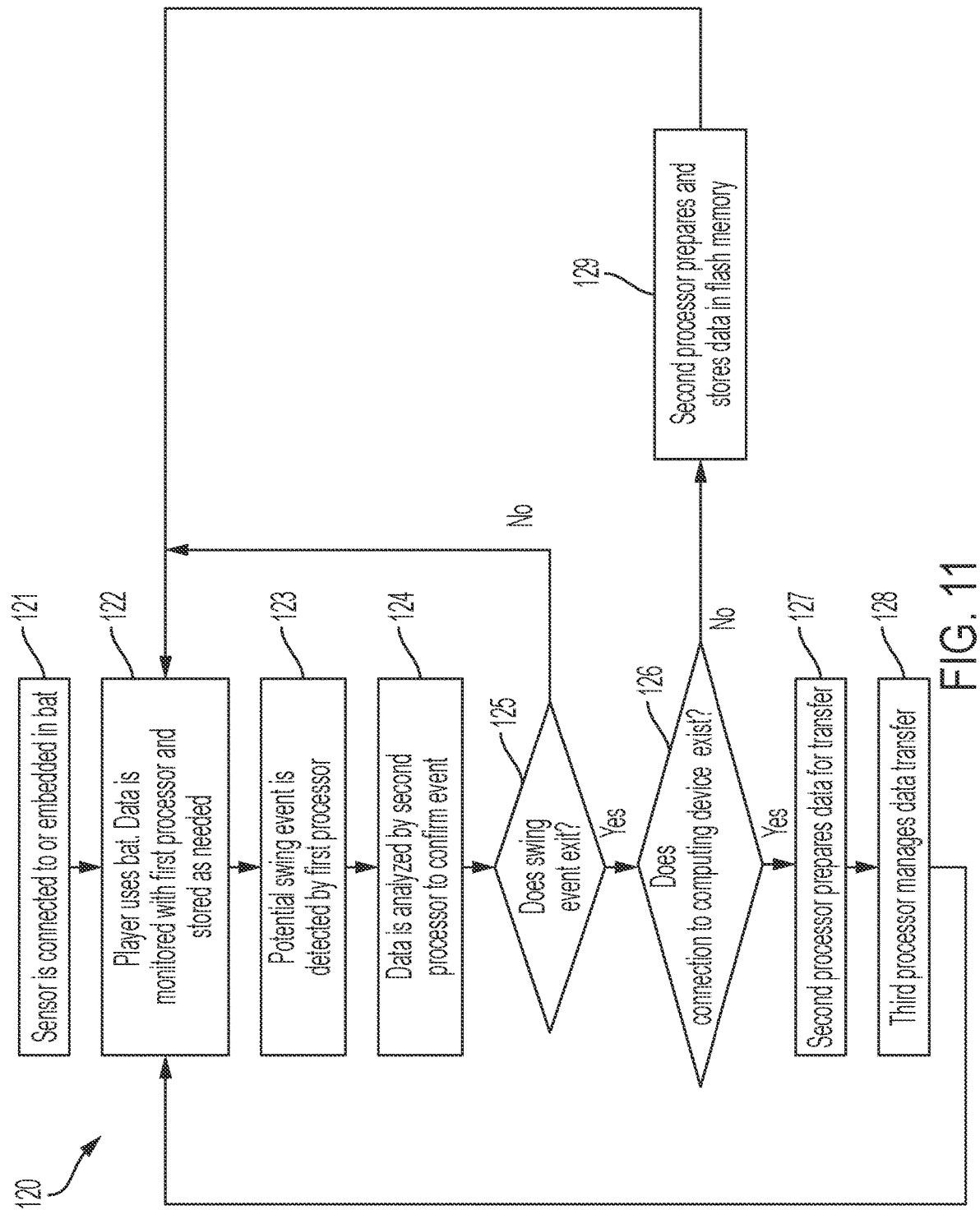
FIG. 11 represents a flowchart of a typical workflow of a sensor collecting data for a baseball or softball swing or pitch.

The above workflow for collecting data is illustrated in FIG. 11. The process 120 begins by step 121 in which the sensor is connected to the bat of interest (in some cases this may be done during manufacture of the bat). Other steps including waking the sensor (which may occur automatically upon detection of motion as described above) and pairing the sensor with a mobile or other computing device may be required but are not explicitly stated in the flowchart of FIG. 11. Once the sensor is awake it begins collecting data (step 122) from the transducers using the first processor (SNC 111 of FIG. 10 in this example). The first processor may store the data in RAM. The player may move the bat in any number ways, such as normal movements of the bat during games and practice, and the first processor monitors the data with the purpose of recognizing a swing event. Therefore, the first processor, in this and the other workflows below, may be considered to be a processor of a swing detection system. If a swing event is not found the data is discarded after a given time period, such as 1 second or 2 seconds. If a potential swing event is recognized (step 123), the first processor 111 alerts the second processor (112 of FIG. 10), which then analyzes the stored data in step 124 to confirm or reject that a swing has occurred, as depicted by the decision step 125. The second processor may therefore be referred to in this and other embodiments as a data analysis processor. If the second processor concludes that a swing event has not occurred, some or all of the data may be ignored and the second processor resumes its previous activity and the first processor continues to receive and analyze data for potential swing events. If the second processor concludes that a swing event has occurred, then it will prepare the data for transfer and determine the proper next step. A decision is made in step 126 about how to handle the data. If a connection to a computing device (such as computing device 106 or server 107 in FIG. 1) exists then the second processor may function as a transfer preparation processor and prepare data for transfer and store (or leave, if no further processing is needed) the data in RAM 115 at step 127 so that it may be transferred. The third processor (such as processor 113 of FIG. 10 in this example), which may be referred to in this and other embodiments as a data transfer processor, will then execute the transfer of data to computing device at step 128. If no external computing device is available at step 126, then the second processor will store the data in non-volatile memory 93 (of FIG. 9) or other memory as depicted by step 129 until such time that a connection with a computing device becomes available. The second process then resumes its previous activity. The first processor continues to receive and analyze data from the transducers (step 122).

It is understood that in the workflow depicted in FIG. 11, the tasks performed by various processors may be interchanged as appropriate to obtain the best outcome, such as minimum energy consumption, maximum processing speed, minimum data transfer, or some other best performance criteria. In addition, the embodiment shown includes three processors in the system-on-chip hardware, but greater or fewer processors may be used as performance criteria dictate, and these processors may or may not be integrated into a single integrated circuit (on the same chip such as a System on Chip or related device) within the sensor.

Figure 12:
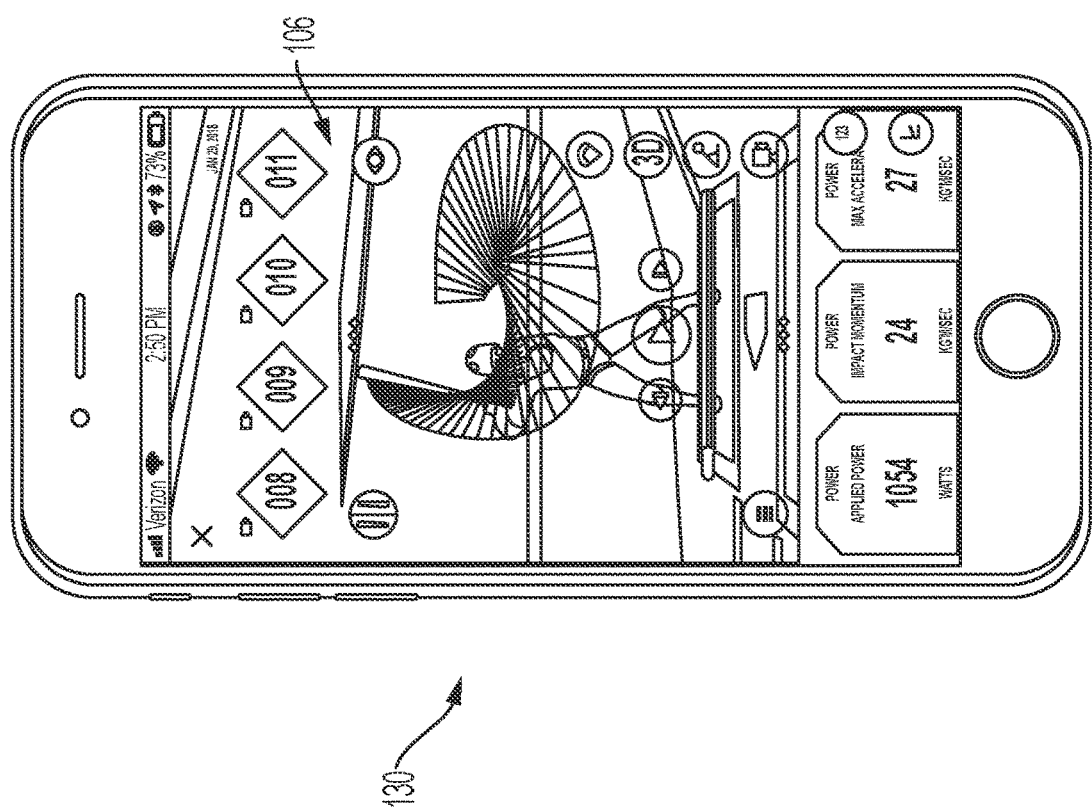
FIG. 12 shows a screenshot of an application of the present disclosure on a mobile computing device.

In a typical workflow, the computing device 106 will have an installed software application for displaying visual representations of data captured by the system. An example user interface 130 of the application as it appears on a display of computing device 106 is shown in FIG. 12. The application on the computing device 106 may carry out further calculations based on the data received from the sensor to compute various metrics about the bat's motion and trajectory from the sensor data, such as how far the knob moved from an ideal path, how fast the bat moved, and other metrics. As an optional feature, the software application also may enable use of the mobile electronic device's camera to capture a video of the batter's swings. The computing device, running the software application, may then tag video clips and corresponding bat trajectory data so that the video, bat trajectory data and calculated metrics can be viewed together and/or transferred to the server 107. The application may be configured to cause the computing device to transmit the calculated metrics and video (if captured) to an external, cloud-based server 107 (of FIG. 1) for storage. The user (or other authorized users, such as the batter's coach) may then use the application on a remote computing device 108 (of FIG. 1) to retrieve this information from the server at a later time.

Figure 13:
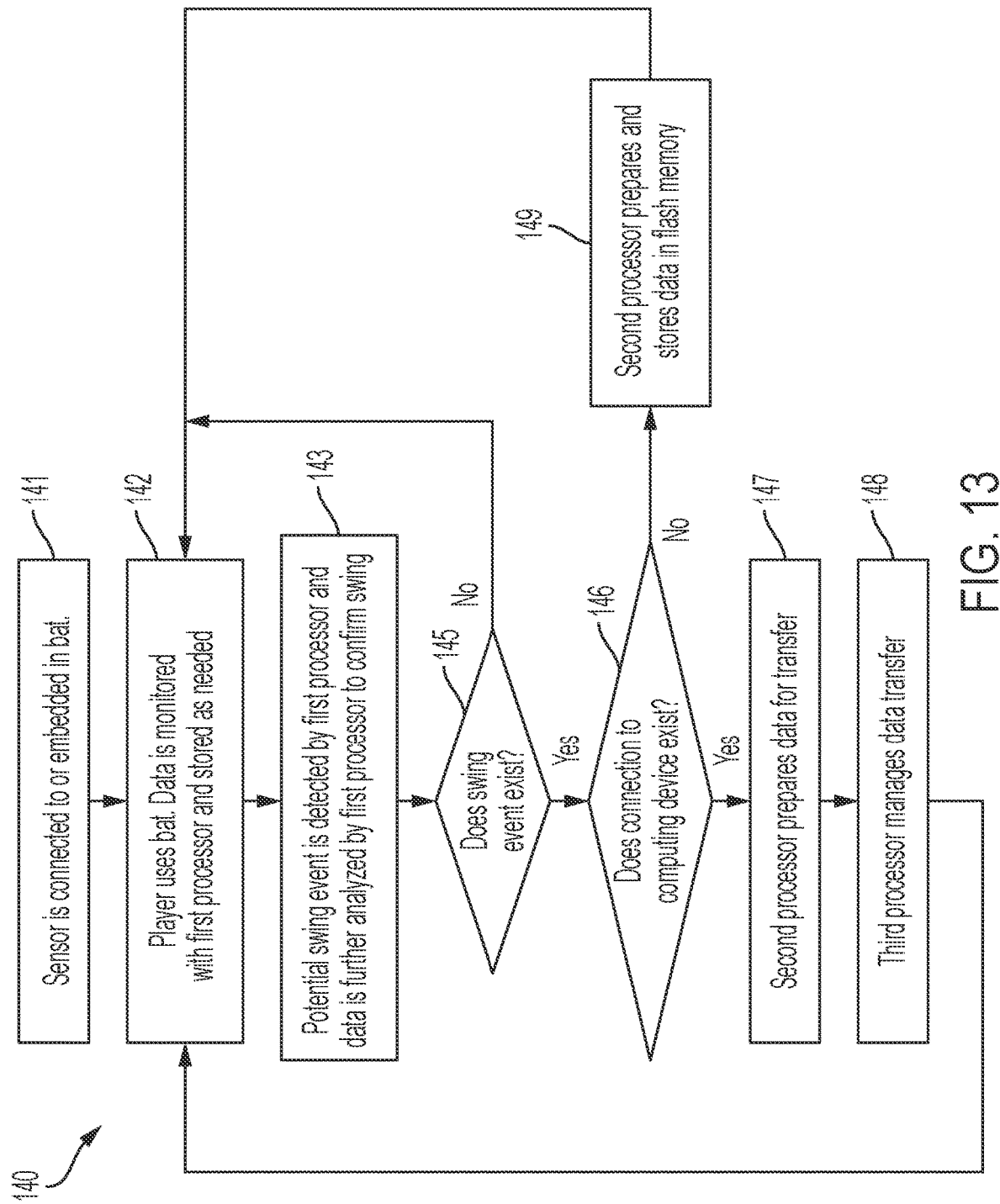
FIG. 13 represents a flowchart of an alternate workflow of a sensor collecting data for a baseball or softball swing or pitch with a variation in monitoring of data by processors for detection of a motion event.

An alternate workflow 140 for the sensor is depicted in FIG. 13 in which steps 123 and 124 of flowchart 120 (FIG. 11) are combined into step 143 so that the data is monitored solely by the SNC or an equivalent processor to determine if a swing event has been detected. As with the process of FIG. 11, the workflow 140 of FIG. 13 begins by step 141 in which the sensor is connected to the bat of interest (in some cases this may be done during manufacture of the bat). Other steps including waking the sensor (which may occur automatically upon detection of motion as described above) and pairing the sensor with a mobile or other computing device may be required but are not explicitly stated in the flowchart of FIG. 13. Once the sensor is awake it begins collecting data (step 142) from the transducers using the first processor (SNC 111 of FIG. 10 in this example). The first processor may store the data in RAM. The RAM is a temporary data storage device, and if a swing event is not found then some or all of the data may be discarded after a given time period. When a potential swing event is recognized (step 143), the system may make a decision 145 about whether or not a swing event actually exists, and also a decision 146 about whether a connection to a computing device is available as before in workflow 120. If a computing device is available (146: YES), then the second processor 112 may function as a transfer preparation processor and prepare the data for transfer to an external computing device as in step 147, which may be completed by the second processor or a third processor 113 as in step 148. If no external computing device is available to receive the data, then the second processor may prepare the data for future transfer and store the data in flash memory (or another non-volatile memory device) as in step 149.

Figure 14:
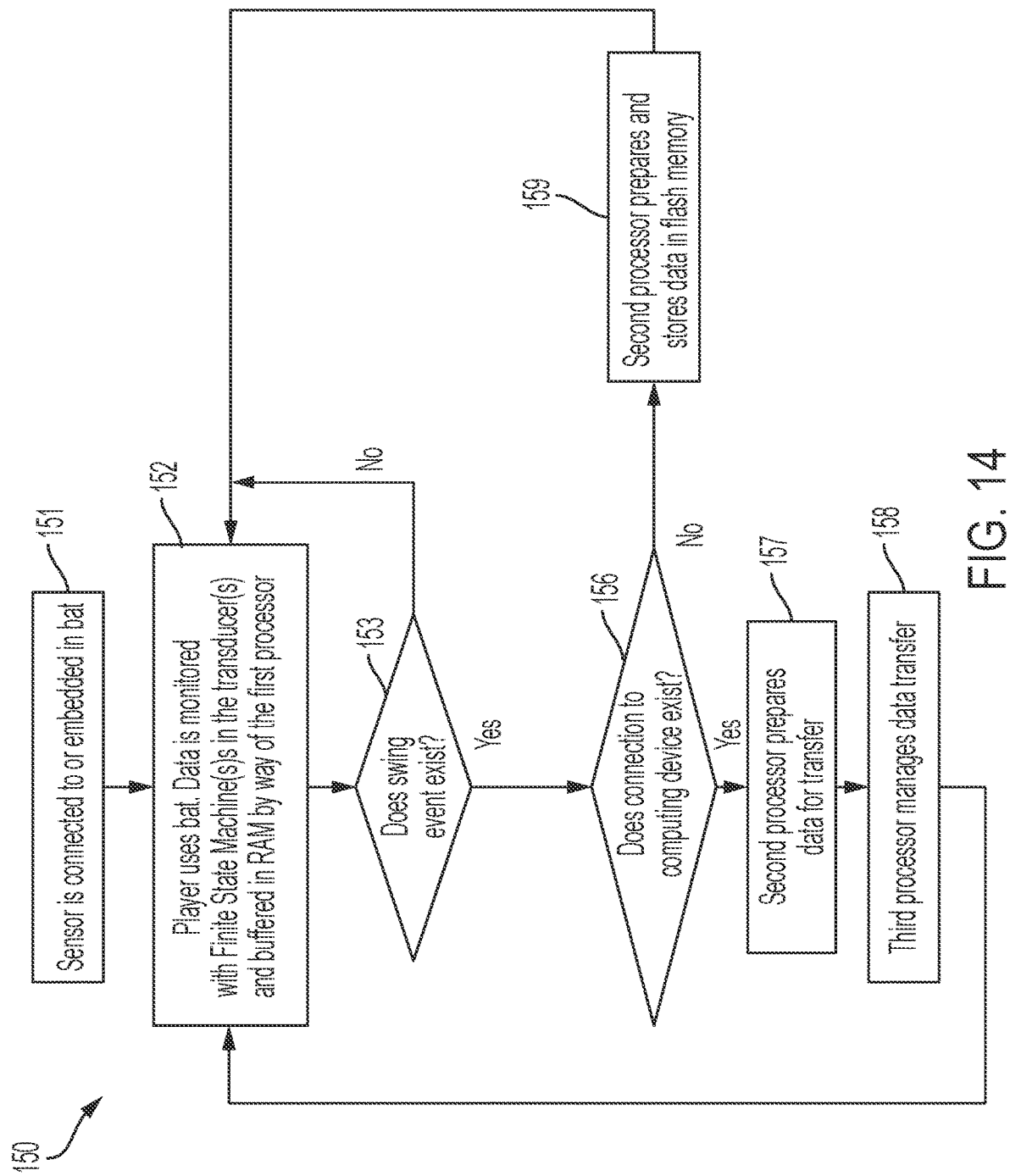
FIG. 14 represents a flowchart of an alternate workflow of a sensor collecting data for a baseball or softball swing or pitch with a variation in monitoring and handling of data by processors for detection of a motion event.

Yet another alternate workflow for capturing motion data of interest is depicted in FIG. 14, which has the objective of minimal processor involvement and minimal power consumption and which involves executing some or all of the event detection logic on specialized hardware on one or more of the transducers instead of by a processor in the sensor. In this workflow a transducer among transducers 92 (of FIG. 9) continuously monitors its sample data and alters its sampling rate dynamically based on thresholds and timing without any processor intervention. Full motion recognition of complex motion (such as a swing or pitch) can be accomplished by utilizing one or more Finite State Machines (FSMs) in the transducer(s) that change state in response to internal or external data inputs, such as detection of a swing event. Multiple FSM's can be run in parallel in the transducer looking for different motions, or different characteristics of a specific motion. For example, a FSM may be programmed to progress from state to state as certain sequences of data, are observed, for example a period of acceleration lower than a certain threshold followed by a period of angular rotation above a certain threshold, and so forth. The FSM algorithm may be prescribed to conclude with the triggering of actions by one FSM. Alternatively, one may configure one or more FSMs to each enter a prescribed state upon observation of a particular data sequence or pattern (e.g., one may look for a quiet period of acceleration, another may look for a certain angular velocity, another may look for an acceleration spike, etc.) that may be required to occur within a prescribed time period (e.g., 0.5 seconds or 1 second from an initiation time). An FSM may observe these states or may trigger a processor to test the collective FSM states to determine if an event has occurred (for example, if all of or some required number of the FSMs have entered their required states, indicating that they have observed their required data pattern or sequence). Output from these FSMs can propagate to interrupts sent to a primary processor in the sensor or can be used to alter the internal status of the transducer. Implementing the logic associated with event recognition on the transducer(s) (by the FSMs) instead of on a primary processor frees up the processor(s) to perform other tasks or to enter or remain in low power states. The limited logic of the FSM and allowing the clocking of the FSM directly off the sensor sampling rate provides significant power savings compared to other methods of motion event recognition.

An alternative to utilizing Finite State Machine(s) associated with the transducer(s) to detect an event is to use a processor associated with or embedded within the transducer (for example a processor that is part of a system-on-chip circuit that includes the transducer). Such a processor may be programmed with a machine learning algorithm that is trained to identify certain patterns in the transducer data that are representative of the event, thereby resulting in the triggering of another processor in the sensor that an event has occurred.

Using the motion recognition method depicted in FIG. 13, there are multiple ways to buffer the transducer data depending on power consumption and length of buffered data considerations. One solution is to use the SNC 113 to read data from the transducer (among transducers 92 in FIG. 9) into a circular buffer in RAM 115 where the oldest sample is continuously overwritten as new data arrives. Instead of relying on the SNC or other processor to detect an event, however, the FMS on one or more transducer executes detection algorithm(s). The FSM(s) may also do other tasks such as vary the sample rate as appropriate—for example to slow the sample rate when movement of the sensor is recognized as having velocity(ies) or acceleration(s) below a predetermined threshold(s). When the FSM on the transducer recognizes a motion of interest it can send an interrupt to the microprocessor 111 which then segments the circular buffer at approximately the time when the interrupt was registered, resulting in a segmented set of data of interest. Another solution is to utilize memory onboard to the transducer itself. In this alternate configuration onboard memory of the transducer is used to hold samples and the microprocessor 111 and SNC 113 are able to do other tasks or stay in a low power state until an interrupt from the transducer is sent. When this interrupt is received the microprocessor or SNC 113 can read the data stored in the transducer's memory and store it as segmented data of interest.

FIG. 14 shows a possible flowchart of this alternate workflow 150 using one or more FSMs. It is similar to that shown in FIG. 13 with the exception of the event recognition steps. As with the process of FIGS. 11 and 13, the workflow 150 of FIG. 14 begins at step 151 in which the sensor is connected to the bat of interest (in some cases this may be done during manufacture of the bat). Other steps including waking the sensor (which may occur automatically upon detection of motion as described above) and pairing the sensor with a mobile or other computing device may be required but are not explicitly stated in the flowchart of FIG. 14. In this case the transducer data is monitored at step 152 by the Finite State Machine(s) and it is stored in a RAM buffer by way of the first processor. Recognition of a swing event is depicted as decision 153, which occurs in the logic of one or more FSMs. When a swing event is recognized (153: YES), another processor (such as second 112 and/or third processor 113) is alerted in step 153 so that the data may be appropriately handled as described in other steps in the flowchart. In particular, if no swing event exists (153: NO), then some or all of the data may be retained or discarded and further data is collected. If a swing event exists (153: YES), and if an external computing device is available to receive the data (156: YES), then a second processor may function as a transfer preparation processor and prepare the data for future transfer as in step 157, and a third processor (functioning as a data transfer processor) may transfer the data to the computing device as in step 158. If no computing device is available (156: NO), then the second processor may store the data in flash memory (or another non-volatile memory device) as in step 159.

Figure 15:
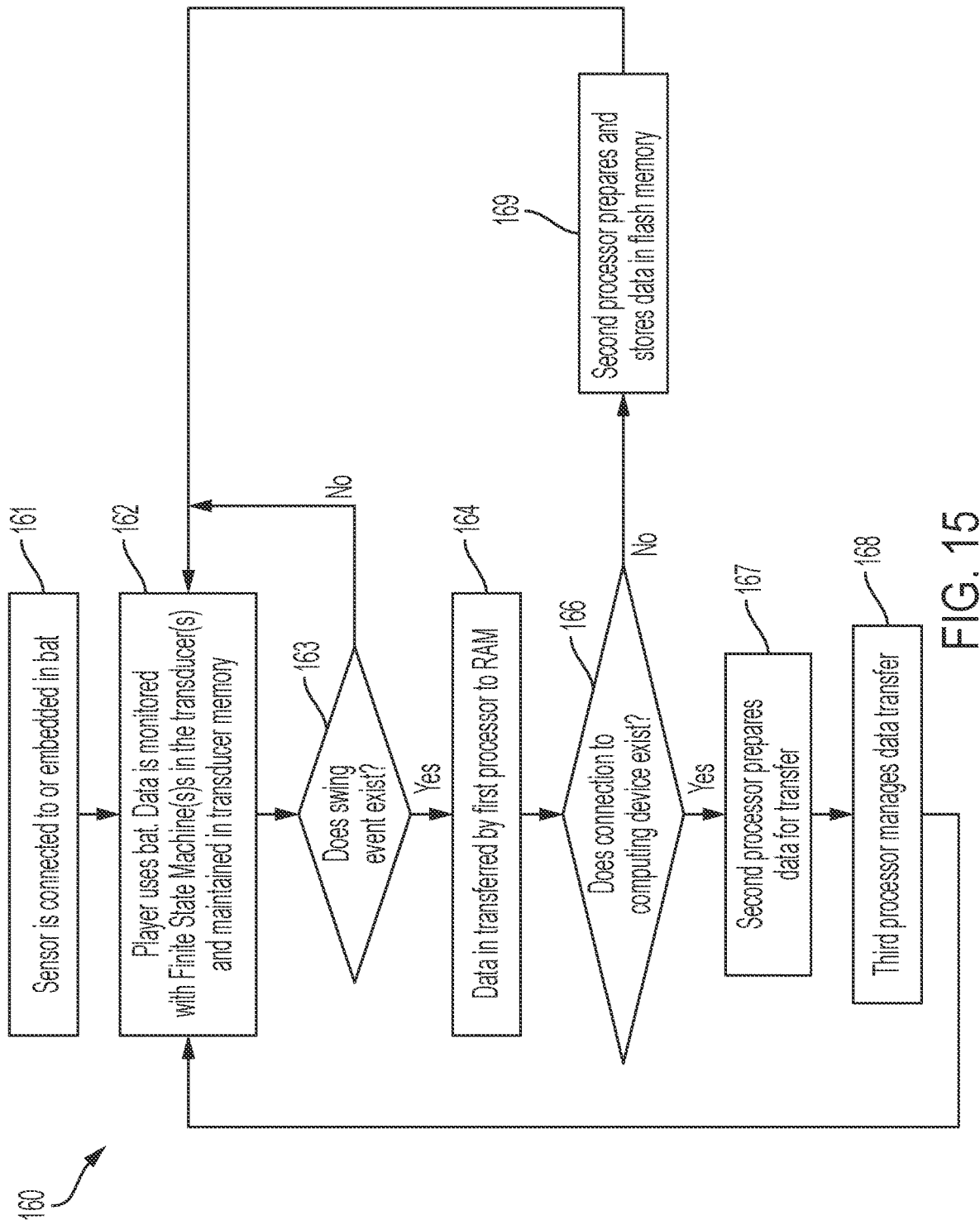
FIG. 15 represents a flowchart of an alternate workflow of a sensor collecting data for a baseball or softball swing or pitch with a variation in monitoring of data by transducer finite state machines for detection of a motion event.

FIG. 15 shows another possible flowchart of this alternate workflow 160. It is similar to that shown in FIGS. 11, 13, and 14 with the exception of the event recognition steps, and starts at step 161 in which the sensor is connected to the bat of interest. In this case the data is monitored at step 162 by the Finite State Machine(s) to monitor the data to recognize an event such as a swing and the data is buffered in transducer memory instead of RAM, as was done in earlier workflows. This method avoids the need for processors to get involved in data handling for most of the sensor's operation, while no event is occurring. Recognition of a swing event is depicted as decision 163, which is done through algorithm execution or logic steps in the FSM(s). When a swing event is recognized, the first processor may be alerted so that the data may be transferred to RAM in step 164 as needed and then appropriately handled as described in other steps in the flowchart. In particular, if an external computing device is available (166: YES), then a second processor may prepare the data for transfer to a computing device as in step 167 and a third processor may manage transfer of the data as in step 168. If no computing device is available (166: NO), then the second processor may prepare and store the data in flash memory (or other non-volatile memory device) as in step 169.

Figure 16:
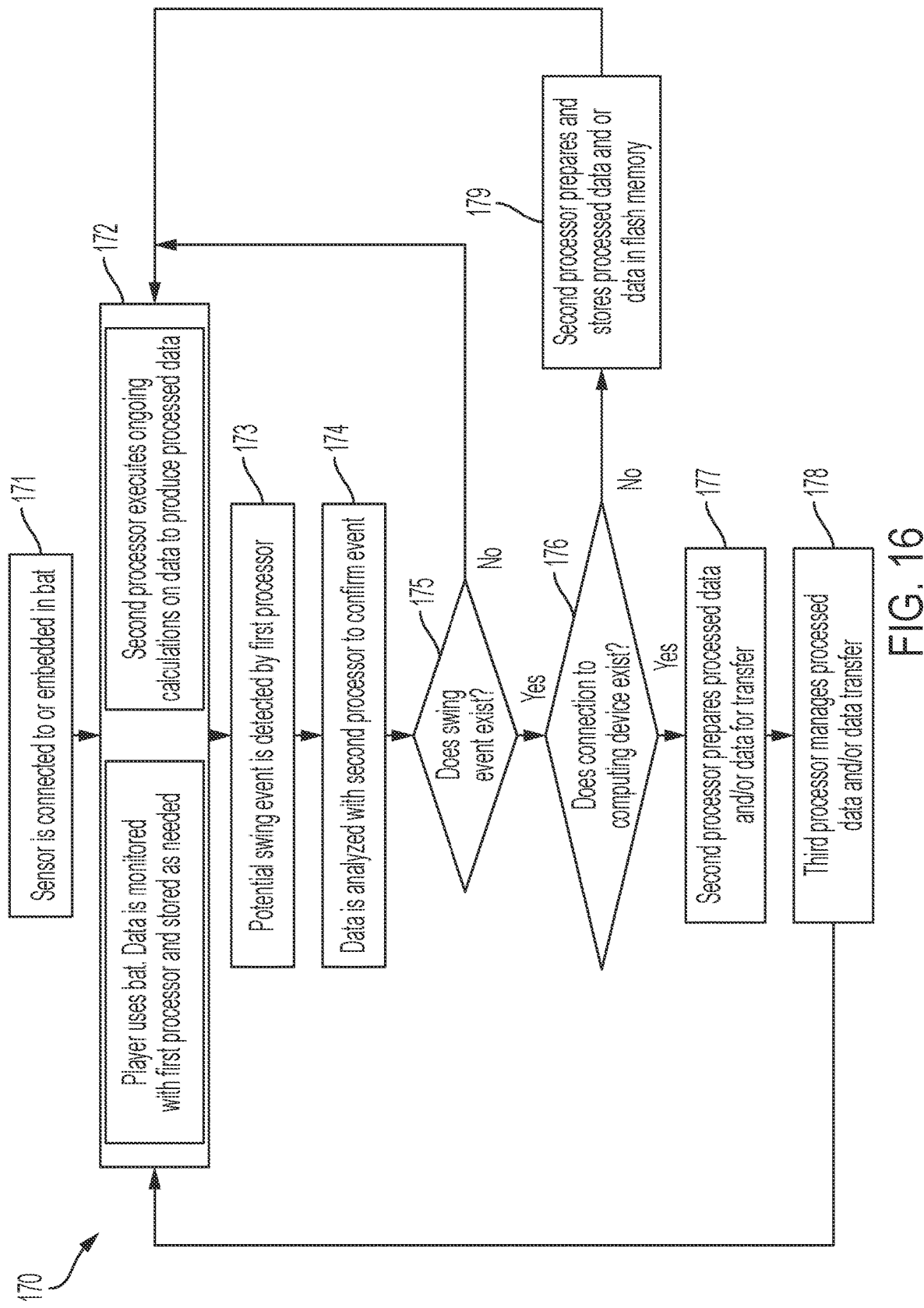
FIG. 16 represents a flowchart of an alternate workflow of a sensor collecting data for a baseball or softball swing or pitch with ongoing computation of data.

Beyond the specific details of event recognition and associated data handling, which make up the primary differences between the workflows depicted in FIGS. 11, 13, 14, and 15, there are alternate workflows that may be implemented to address other performance issues in the sensor. For example, as data is received from the transducers, the first processor can analyze it to determine if an event of interest has occurred but additional calculations based on the data may also occur. A useful workflow 170 is depicted in FIG. 16 in which the second (or other) processor may carry out calculations to keep track of a particular position and orientation of the sensor in the fixed reference frame. Such calculations may be done in the computing device 106 (for example in the application discussed above) and may include subtraction of the gravity vector and numerical integration of the acceleration data in conjunction with update of the angular orientation of the sensor in space based on angular rate gyro data. Such a procedure may allow continual knowledge of the sensor position and orientation, thereby improving knowledge and accuracy of global orientation as well as reducing the data required to be transferred when an event is found. Such calculation results are referred to here as processed data. This workflow proceeds similarly to that depicted in FIG. 11 with step 171 in which the sensor is connected to the bat of interest, and the first processor (such as SNC first processor 111 of FIG. 11) reviews the data as it is received to look for events of interest. Simultaneous to the data monitoring in step 172 by the first processor, this workflow includes ongoing computation of the data by the second processor, such as the computations described above that produce processed data. The processed data and/or the original data may be stored in RAM 115. If a potential swing event is not found the data (original data and/or processed data) may be discarded after a given time period, such as 1 second or 2 seconds. If a potential swing event is recognized in step 173, the second processor (112 of FIG. 11) analyzes the stored data to confirm or reject that a swing has occurred as step 174. If the second processor concludes that a swing event has not occurred (175: NO), decision step 175 causes some or all of the data to be ignored and the second processor resumes its previous activity while the first processor continues to collect and analyze data for potential swing events. If the second processor concludes that a swing event has occurred (175: YES), then the system will prepare the processed data and/or data for transfer and determine the proper next step. In this workflow, the data to be transferred may include the transducer data received and/or some or all of the processed data and/or further possible key results of calculations carried out on the data or processed data in step 172. Specifically, the calculated position and orientation information at a key time point, for example just prior to the initiation of the swing event 86 (of FIG. 8) may be saved for transfer. By saving this key information, the prior transducer data may not be necessary to be further saved or transferred, thereby saving time and energy consumption normally required for transfer of a larger data set. Other key computed data and time points may be saved and transferred, or combinations thereof, such as points 84 or 88 in FIG. 8. The transducer data and/or processed data to be transferred in this workflow may only include data within the time frame of the event, denoted by the period between 86 to 82 or 86 to 87 or some other period in FIG. 9. There are accuracy gains to be achieved by keeping a running account of the spatial orientation of the sensor in the fixed frame so that subsequent events need not require estimated position or orientation or prior data may improve accuracy of future data. It is understood that variations to this workflow may be implemented, such as saving and transmitting of multiple key timepoints, saving or computing partial information such as only certain position or orientation information such as only the fixed frame yaw angle, transferring some of all of the transducer data outside of the event time frame, or other variations and combinations of saving and transferring transducer data and processed data. The remaining workflow in FIG. 16, steps 176-179, proceeds as described in FIG. 11 where transmitted and stored data may include transducer data, processed data, or other data of interest as well as key computed results. In particular, if a computing device is available (176: YES), then a second processor may prepare the data for transfer to a computing device as in step 177 and a third processor may transfer the data to a computing device as in step 178. If no computing device is available (176: NO), then a second processor may function as a transfer preparation processor and may store the data in flash memory (or another non-volatile memory device) for future transfer as in step 179.

It is understood that step 172 in FIG. 16 depicting ongoing calculations on the transducer data may involve a variety of computations. For example, the ongoing calculation may include a digital filtering process, a Kalman filter, or some other computation.

Figure 17:
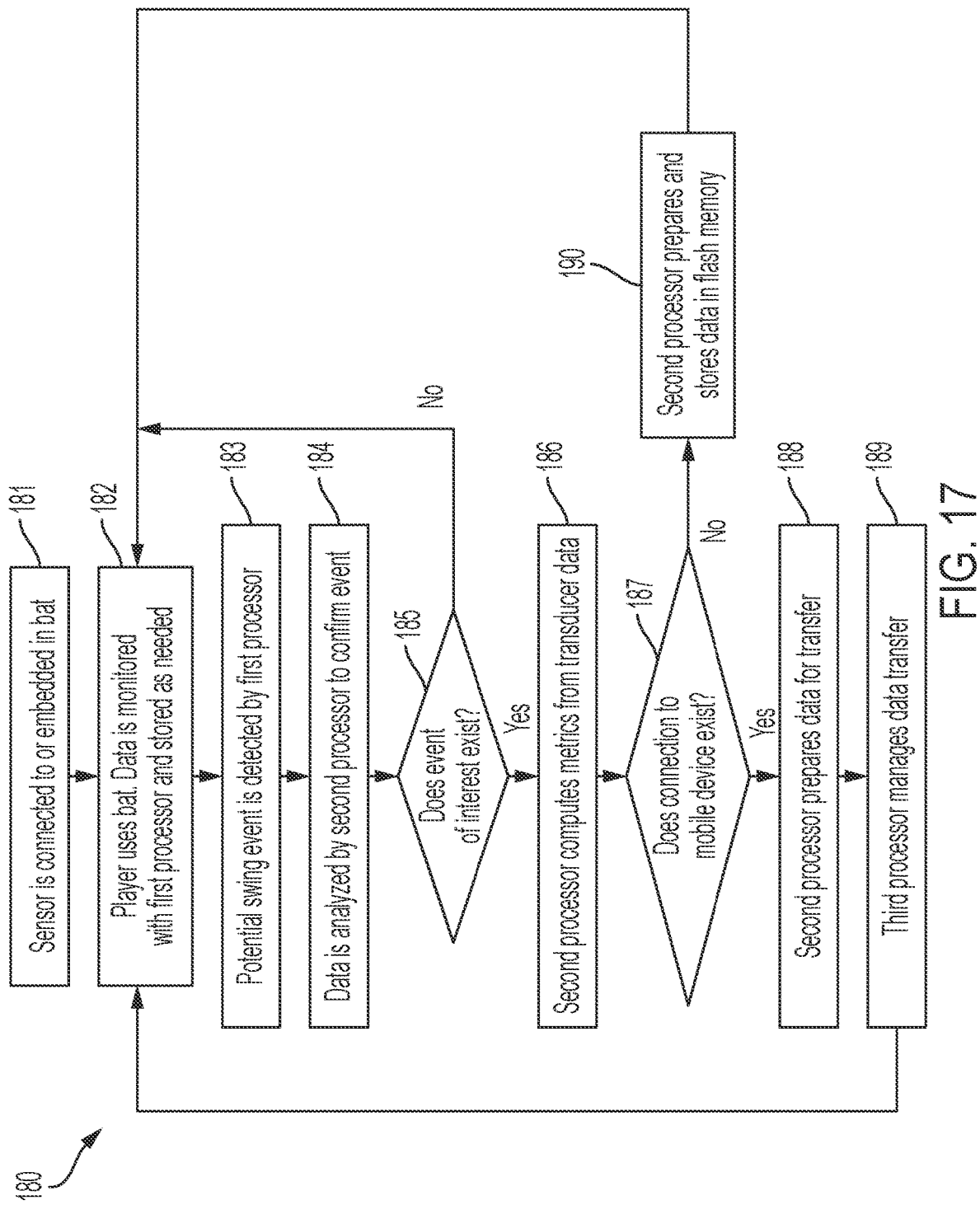
FIG. 17 represents a flowchart of an alternate workflow of a sensor collecting data for a baseball or softball swing or pitch in which some or all motion metrics are computed by the sensor processors.

Yet another workflow involves shifting some of the conventional computation that is done on the computing device 106 to the sensor hardware. FIG. 17 depicts an alternate workflow 180 in which the initial steps are the same as the typical workflow of FIG. 11 such that steps 181-185 proceed similarly to steps 121-125. In particular, at step 181 in which the sensor is connected to the bat. Once the sensor is awake it begins collecting data (step 182) from the transducers using the first processor. If a swing event is not found the data is discarded after a given time period, such as 1 second or 2 seconds. If a potential swing event is recognized (step 183), the first processor alerts the second processor, which then analyzes the stored data in step 184 to confirm or reject that a swing has occurred, as depicted by the decision step 185. If the second processor concludes that a swing event has not occurred (185: NO), some or all of the data may be ignored and the second processor resumes its previous activity, and the first processor continues to receive and analyze data for potential swing events. If the second processor concludes that a swing event has occurred (185: YES), then an additional step is included after an event of interest has been recognized, as denoted by step 186. In this workflow the metrics of interest in the application, for example maximum barrel speed of the bat or impact momentum of the bat, that in other embodiments are typically computed in the computing device 106 are computed by the second processor 111 or other capable processor. The data to be stored and/or transferred in subsequent workflow steps (steps 187-189, which are similar to steps 127-129) is the set of computed metrics and associated time information, although some or all of the original data may also be stored and transmitted as well. In particular, if a computing device is available (187: YES), then the second processor may function as a transfer preparation processor and may prepare the data for transfer to a computing device as in step 188 and a third processor may manage the data transfer as in step 189. If no computing device is available (187: NO), then the second processor may prepare the data and may store the data in flash memory (or another non-volatile memory device) for future transfer as in step 190. A benefit of this approach is that the data required to be transferred to the computing device 106 is much less than in the typical workflow, since the transducer data is no longer needed to be transferred, thereby reducing energy consumption and time of transfer, as well as enabling a much larger number of data sets for events to be stored in the sensor external flash memory 93, if needed. It is understood that variations to this workflow may be implemented, such as computation of a portion of the metrics instead of the full set of metrics used in the application on the computing device 106, computation and/or transfer of a portion of the sensor fixed-frame data instead of all of the data, transfer and/or storage of some or all of the original data, or combinations of these.

It is understood that certain steps shown in the workflows depicted in FIGS. 11, and 13-17 may be omitted or combined to create modified workflows. For example, one may include variations of ongoing computations introduced in FIG. 16 along with computation of metrics data introduced in FIG. 17, and any of the event detection methods may be included with these computation steps.

It is common practice that wearable sensors, such as the sensors described in this disclosure, are powered by rechargeable batteries. Because these sensors are generally connected to the body of interest and are not wired to any other device, they generally receive their power from a battery, and that battery must be occasionally recharged. Alternatively, though less common for such sensors, the battery may be replaceable, such as a replaceable coin cell battery. A much better use case for the user is to eliminate the need for recharging or battery replacement and to use a battery that has enough charge for the lifetime of the sensor, commonly referred to as a primary battery. This has generally not been possible in wearable sensors of the type described in this disclosure, given the power requirements of the circuitry and transceiver hardware typically used in these devices, coupled with the size restrictions on the sensor, including the onboard battery. Innovations in the hardware and workflow enable the sensor energy consumption needs to be small enough to allow the full lifetime of energy to be stored in a battery that may be housed within the device. For example, a battery such as a common CR2032 coin cell battery may be used, which has approximately a 200 mAh capacity at 3V. With appropriate sensor architecture, one may use this battery in a "single use" case, in other words with no battery recharge or replacement, wherein a single battery capacity survives the full life of the sensor, which may be defined as a length of time that is beneficial to the user, such as 1 year or 2 years or 1,000 or 5,000 or 10,000 events (swings or pitches). This approach not only eliminates the pain point for the user of recharging or replacing the sensor's battery, but it eliminates the required recharging hardware (for example a portion of 95 of FIG. 9), thus reducing overall system cost and simplifying overall system design as the charging circuitry in the sensor can be removed, and the charging hardware external to the sensor (e.g., cable, transformer, inductive coil, etc.) may be eliminated as well. In addition, elimination of charging opens the design space for incorporating the sensor into the system to be measured. For example, the sensor may be fully embedded in a bat such that no access is needed by the user, thereby making the equipment itself "smart" and in effect an extension of the sensor housing. A further advantage of a fully-embedded embodiment is possible elimination of the sensor housing, such as the plastic housing normally needed to protect a typical system as shown in FIG. 9. Furthermore, a sensor may be embedded in a metal bat or other sealed container with no need for wired access for charging and no limitations of inductive charging such as proximity to an antenna or concern about materials receiving or interfering with the electromagnetic charging fields.

A key benefit of using a multi-core processing device architecture such as the example depicted in FIGS. 9 and 10 is the ability to more effectively manage power than in a conventional single processor environment. For example, some processing devices 110 such as the DA14695 have multiple power domains. For example, referring back to FIG. 10, the processor that performs data analysis and transfer preparation functions (second processor 112) may be part of a System Power Domain 192, the data transfer processor (third processor 113) may be part of a Radio Power Domain 193, the first processor 111 which detects data from the transducers may be part of a Communications Power Domain 191, and the RAM 115 may be part of a System RAM Power Domain. It is understood that other components and subsystems besides those depicted in FIG. 10 may be part of the various power domains, and other power domains may exist, such as the Peripherals Power Domain, the Timers Power Domain, and the Always On Power Domain.

It is also understood that other processor systems may be used that exhibit multiple power domains as illustrated here. These power domains may be managed, as described in the workflow of FIG. 12 (or alternatively FIG. 14, 15, 16, 17, or 18) such that energy consumption may be reduced to the point of eliminating the need for battery recharge or replacement. In each of the workflows, the architecture of FIG. 9 may make use of multiple transducer interrupts, which are connected to the Always On Power Domain. The Power Domain Controller (PDC) 119 may be a processor that is programmed to be responsible for activation and de-activation of the digital power domains of the system. Having multiple power domains enables various portions of the processing device to function independently, reducing the power needed for operation.

The various processors may remain in a sleep mode until they receive a wake signal, in which case the processors will change from a sleep mode to a wake mode. In these cases, the wake mode will be a mode of operation with enough power to perform processing functions, while the sleep mode will be a relatively lower power mode (or an off mode) that only needs to be able to detect the wake signal. For example, during normal operation the first processor 111 may remain in a sleep mode until the PDC receives an interrupt signal from a transducer, for example when the transducer recognizes a certain pattern of motion such as an acceleration that indicates a double-tap of the bat has occurred or an acceleration above a predetermined threshold has occurred, although many other prescribed transducer patterns may be utilized. At that time, a signal from the PDC 119 may cause the first processor 111 to wake up (i.e., transition from sleep mode to operational or wake mode), and the first processor 111 may then directly communicate with the transducer and write the transducer data into system RAM 115 (which may be in yet another power domain) depending on the workflow in use. The second processor 112 may continue performing other tasks with no knowledge of the sensor data, or it may be powered off completely while the first processor 111 manages capture of the transducer data. At some intervals of data collection (for example, after a certain number of samples have been collected), the second processor 112 may be woken up by the first processor 111 or the PDC, at which point the second processor 112 may analyze the data to determine whether the data is characteristic of a swing. Similarly, the third processor 113 may remain powered off or in a low power mode unless and until it receives an interrupt signal from the second processor 112, indicating that swing data is available to transmit.

By incorporating the use of various power domains in conjunction with the workflows described herein, one may realize a sensor that may be fully embedded within a device that does not require recharge or replacement of its battery, such as a smart bat or smart ball that contains the full charge necessary for its lifetime of operation such as six months, or one year, or three years or 1,000 or 5,000 swing or throw events.

Figure 18:
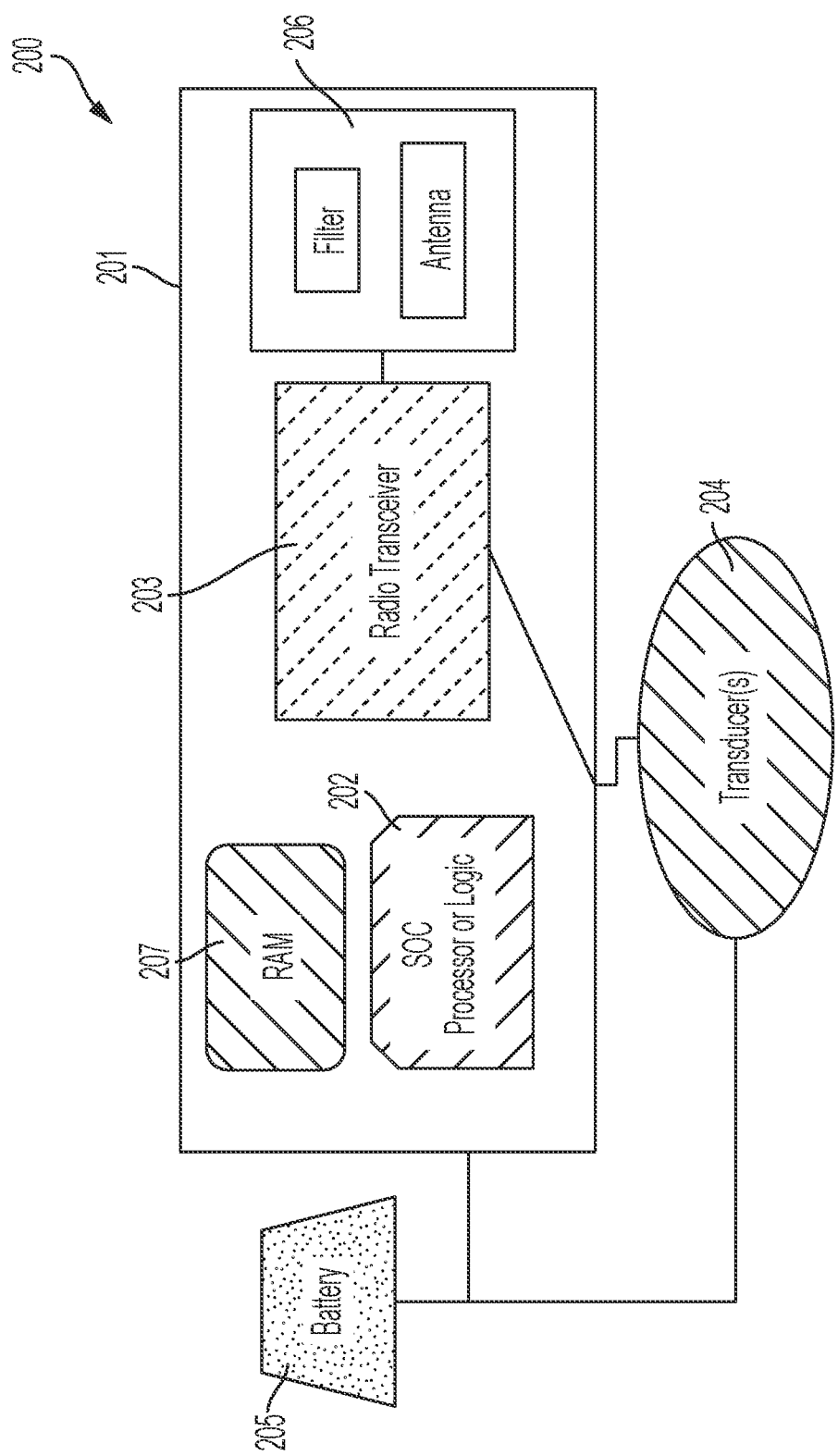
FIG. 18 shows example minimal sensor hardware architecture in which a transducer carries out the necessary computations and analyses of the data.

FIG. 18 depicts example sensor hardware architecture 200 that may be utilized to realize a single-use battery operation or other low-power or low-component design. In this case, one or more transducers 204 are used wherein at least one is a "smart transducer" that incorporates a finite state machine or other logic or processing capability such that it can carry out processing that would otherwise be done on a processor in earlier workflows in this disclosure, or alternatively can perform analysis of data such that no other processing is necessary before transmission. The transducer(s) 204 can be connected to a system-on-chip or system-in-package device 201 that may include minimal processing or other electronics 202 to manage the sensor operation (such as managing power usage and basic states of operation) and/or to process data. The sensor can include a radio transceiver 203 as part of the system-on-chip or as a separate entity. The system-on-chip device may also incorporate a filter and/or antenna 206, or these may be separate components in the sensor as depicted in earlier figures. The radio, filter, and antenna allow the sensor to communicate with an external computing device. The system-on-chip device 201 may include optional RAM 207 for temporary storage and/or compression of data prior to transmission. The sensor 200 includes a battery 205 that is chosen such that its capacity meets the energy demand of the sensor for a designed life, which may be a certain number of motion events that are captured and transmitted or a certain amount of operational time. While the system of FIG. 18 may process data for event recognition or calculation of processed data or metrics, a key benefit to the architecture 200 and workflows described in this disclosure over that of conventional sensors is that no separate processor is required to analyze, compute, or manage the data from the transducer(s). All necessary computation or analysis of the transducer data can be done within the transducer hardware, for example analyzing transducer data to recognize events, computing motion data and/or metrics from transducer data, or combinations of these. For example, a finite state machine within a transducer may analyze transducer data to determine when a motion event such as a swing has occurred, and the transducer data for that swing event may then be sent to the radio transceiver for transmission to a computing device. Likewise, if computations are carried out on the data collected by the transducer, such as computing motion data, then that resulting motion data may be transferred when an event of interest occurs that is recognized by the transducer.

Figure 19:
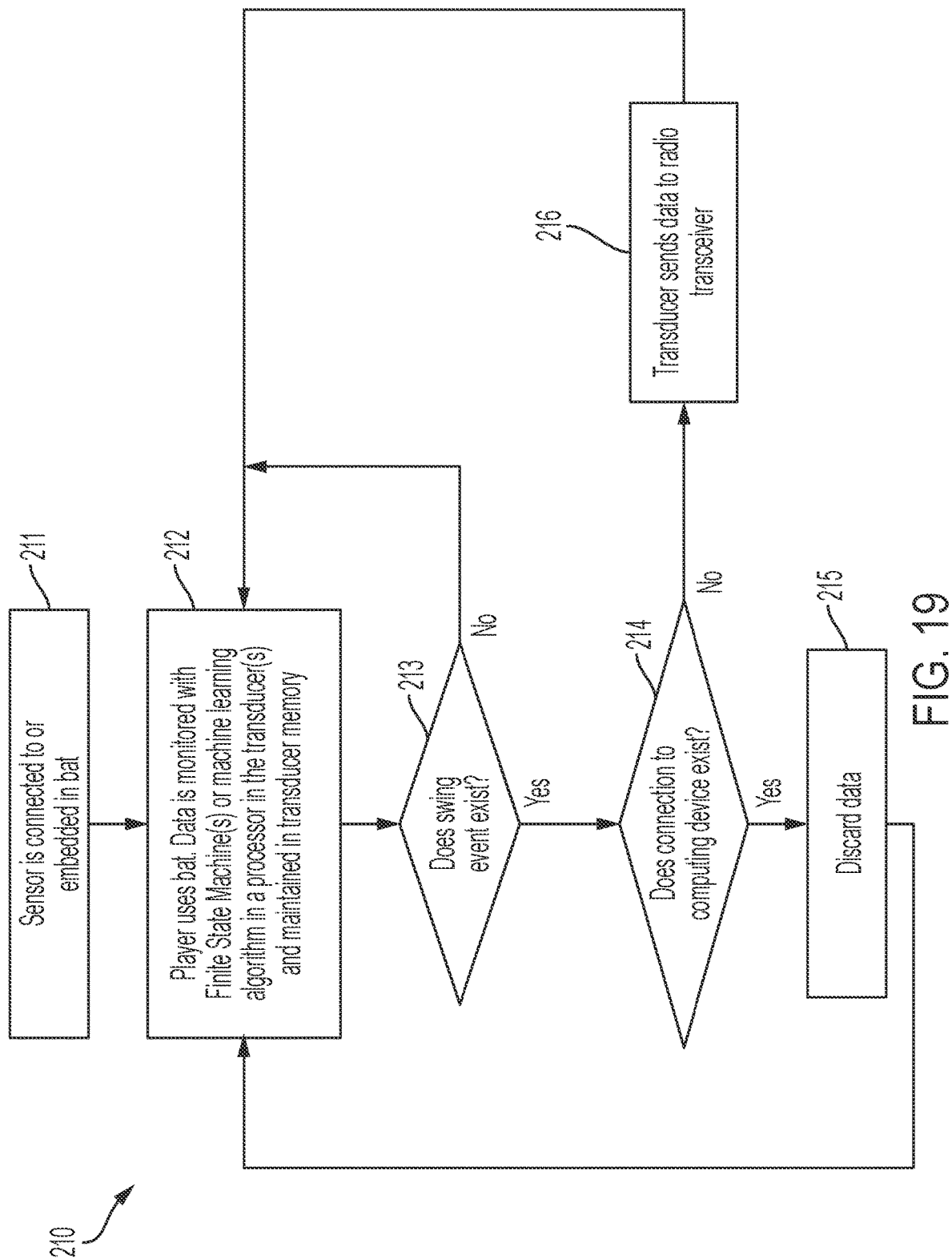
FIG. 19 shows a workflow associated with the sensor architecture of FIG. 18.

FIG. 19 depicts a workflow 210 associated with the sensor architecture of FIG. 18. Similar to the previous workflows described herein, the process begins with sensor connection to the bat (step 211), which in this case is likely during manufacture of the bat for a single-use battery design. As the player uses the bat in step 212 the transducer hardware monitors the data and looks for a swing event (and optionally carries out other computations on the data as described above). If a swing event is recognized in step 213, steps 214-216 indicate the appropriate steps: if no receiving computing device is available (214: NO) the data is discarded at 215; if a computing device is available (214: YES), the data is sent to the transceiver for transmission at 216 (possibly by way of system-on-chip RAM as described above). Note that it is possible, as described in several workflows and schematics above, to incorporate external RAM in the sensor so that the data is not discarded at step 215 but instead is stored until a connection to a computing device is available.

Certain terms that are used above are defined below.

The terms "electronic device" and "computing device" refers to a device or system that includes a processor and memory. Each device may have its own processor and/or memory, or the processor and/or memory may be shared with other devices as in a virtual machine or container arrangement. The memory may contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smartwatches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. Electronic devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion below, a client device, server device, virtual machine or container may be referred to simply as a "device" for brevity.

The term "processor" refers to a hardware component of an electronic device that is configured to execute programming instructions. Except where specifically stated otherwise, the singular term "processor" is intended to include both single-processing device embodiments and embodiments in which multiple processors together or collectively perform a process.

The terms "memory," "memory device," "data store," "data storage facility," "data storage device" and the like each refer to a non-transitory device on which computer-readable data, programming instructions or both are stored. Except where specifically stated otherwise, the terms "memory," "memory device," "data store," "data storage facility," "data storage device" and the like are intended to include single device embodiments, embodiments in which multiple memory devices together or collectively store a set of data or instructions, as well as individual sectors within such devices. When such devices are referred to a "temporary" (as in a "temporary data storage device"), they are intended to refer to volatile memory devices that temporarily store data while a system performs processing operations on the data. Example temporary storage devices include random access memory (RAM) devices, including dynamic RAM (DRAM) and static RAM (SRAM). The term "flash RAM" refers to non-volatile memory that retains data or stored program instructions after power has been removed.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link, either directly or indirectly via one or more intermediate devices and/or systems. "Electronic communication" refers to the transmission of data via one or more signals between two or more electronic devices, whether through a wired or wireless network, and whether directly or indirectly via one or more intermediary devices.

In this document, the term "camera" refers generally to a hardware sensor that is configured to acquire digital images. A camera may capture still and/or video images, and optionally may be used for other imagery-related applications. For example, a camera can be held by a user such as a DSLR (digital single lens reflex) camera, cell phone camera, or video camera. The camera may be part of another electronic device, such as a mobile phone or tablet in some embodiments. In addition, an imaging device can be mounted on an accessory such as a monopod or tripod. The imaging device can also be mounted on a transporting vehicle such as an aerial drone or a robotic vehicle having a transceiver that can send captured digital images to, and receive commands from, other components of the system.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A system for monitoring motion of a movable object, the system comprising a housing that contains:
a non-volatile data storage device;
a data transfer processor;
a sensor that is configured to:
be connected to either a movable object or a person who is carrying the movable object, and
generate data that represents movement of the movable object; and
a swing detection system that is programmed with programming instructions to:
analyze the data generated by the sensor and identify, in the data, a data set representing a swing event, and
after determining that the data set corresponds to a swing event:
determine whether the data transfer processor is communicatively connected to an external system; and
if the data transfer processor is communicatively connected to the external system, transfer the data set to a location via which the data transfer processor may receive the data set for communication to the external system, otherwise save a first copy of the data set to the non-volatile data storage device.

2. The system of claim 1, wherein the swing detection system comprises:
a first processor and programming instructions that are configured to cause the first processor to:
receive the data generated by the sensor and identify, in the data, the data set representing a potential swing event; and
a second processor, along with programming instructions configured to cause the second processor to:
receive the data set representing the potential swing event, and
analyze the data set to determine whether the data set corresponds to an actual swing event.

3. The system of claim 2, wherein:
the system further comprises a volatile memory;
the programming instructions that are configured to cause the first processor to transfer the data set to the location comprise instructions to transfer the data set to the volatile memory for retrieval by the second processor; and
the programming instructions that are configured to cause the second processor to receive the data set comprise instructions to retrieve the data set from the volatile memory.

4. The system of claim 1, wherein:
the sensor comprises:
a transducer that is configured to generate the data that represents movement of the movable object, and
a circuit that is electrically connected to the transducer, wherein the circuit comprises a finite state machine; and the swing detection system is implemented by the finite state machine, in which the circuit will:
monitor the data that represents movement as the data that represents movement is generated by the transducer,
detect the swing event in the data, wherein the swing event represents movement, and
change state when the circuit detects the swing event.

5. The system of claim 1, wherein the swing detection system is further programmed with programming instructions to, upon determining that the data transfer processor is communicatively connected to the external system, transfer the data set to the external system.

6. The system of claim 5, wherein:
the system further comprises a volatile memory;
the programming instructions to transfer the data set to the location comprise instructions to transfer the data set to the volatile memory; and
the programming instructions to transfer the data set to the external system comprise instructions to, by the data transfer processor, retrieve the data set from the volatile memory and transfer the data set to a transceiver for transmission to the external system.

7. The system of claim 1, wherein the swing detection system is further programmed with programming instructions to:
compute metrics from the data set; and
upon determining that the data transfer processor is communicatively connected to the external system, transfer the metrics to the external system.

8. The system of claim 1, wherein the swing detection system is programmed with programming instructions to, after detecting the swing event and before determining whether the data transfer processor is communicatively connected to the external system, transfer swing event data to a queue of a memory device.

9. The system of claim 1, wherein the data storage device is a non-volatile memory device.

10. The system of claim 1, wherein:
the swing detection system comprises a data analysis processor that is configured to analyze the data generated by the sensor and identify the data set representing a swing event; and
the data analysis processor is in a first power domain and the data transfer processor is in a second power domain.

11. The system of claim 2, wherein:
the first processor is configured to, upon identification of the potential swing event in the data, either:
generate a wake signal and send the wake signal to the second processor, or
cause a power domain controller to generate the wake signal and send the wake signal to the second processor; and
the second processor is configured to change from a sleep mode to a wake mode in response to receipt of the wake signal.

12. The system of claim 4, wherein the first processor is configured to remain in a sleep mode until receipt of a wake signal from the transducer, either directly or indirectly via a power domain controller in response to receipt of a signal from the transducer.

13. The system of claim 11, wherein:
the second processor is configured to, upon determination that the data set corresponds to an actual swing event, either:
generate a second wake signal and send the second wake signal to the data transfer processor, or cause a power domain controller to generate the second wake signal and send the second wake signal to the second processor; and the data transfer processor is configured to change from a sleep mode to a wake mode in response to receipt of the second wake signal.

14. A method of monitoring motion of a movable object, the method comprising:
by a sensor that is connected to either a movable object or a person who is carrying the movable object:
generating data that represents movement of the movable object; and
by a data handling processor, a data analysis processor, or both of a swing detection system:
by a data handling processor, a data analysis processor, or both of a swing detection analyzing the data generated by the sensor and identifying, in the data, a data set representing a swing event, and
after determining that the data set corresponds to a swing event:
determining whether a data transfer processor of the swing detection system is communicatively connected to an external system; and
if the data transfer processor is communicatively connected to the external system, transferring the data set to a location via which the data transfer processor may receive the data set for communication to the external system, otherwise saving a first copy of the data set to a non-volatile data storage device.

15. The method of claim 14, wherein analyzing the data generated by the sensor and identifying, in the data, a data set representing a swing event comprises:
by the data handling processor of the swing detection system, receiving the data generated by the sensor and identifying, in the data, the data set representing a potential swing event; and
by the data analysis processor of the swing detection system, receiving the data set after the potential swing event is identified by the first processor and analyzing the data set to determine whether the data set corresponds to an actual swing event.

16. The method of claim 15, further comprising:
by the data handling processor, in response to identifying the potential swing event, transferring the data set to a volatile memory for retrieval by the data analysis processor; and
by the data analysis processor, retrieving the data set from the volatile memory.

17. The method of claim 14 further comprising, by the swing detection system in response to determining that the data transfer processor is communicatively connected to the external system, transferring the data set to the external system.

18. The method of claim 17, wherein:
transferring the data set to a location comprises transferring the data set to a volatile memory; and
transferring the data set to the external system comprises, by the data transfer processor, retrieving the data set from the volatile memory and transferring the data set to a transceiver for transmission to the external system.

19. The method of claim 15, further comprising:
by the data handling processor, upon identification of the potential swing event in the data, either:
generating a wake signal and sending the wake signal to the data analysis processor, or
causing a power domain controller to generate the wake signal and send the wake signal to the data analysis processor; and
by the data analysis processor, changing from a sleep mode to a wake mode in response to receipt of the wake signal.

20. The method of claim 19 further comprising, by the data handling processor, remaining in a sleep mode until receipt of a wake signal from a transducer, either directly or indirectly via a power domain controller in response to receipt of a signal from the transducer.

21. The method of claim 19, further comprising:
by the data analysis processor, upon determination that the data set corresponds to an actual swing event, generating an interrupt signal; and
by the data transfer processor, changing from a sleep mode to a wake mode in response to receipt of the interrupt signal or a signal derived from the interrupt signal.

22. A method of monitoring motion of a movable object, the method comprising:
by a sensor that is connected to either a movable object or a person who is carrying the movable object, generating data that represents movement of the movable object;
by a first processor of a swing detection system:
remaining in a sleep mode until receipt of a wake signal from a transducer, either directly or indirectly via a power domain controller in response to receipt of a signal from the transducer,
receiving the data generated by the sensor and identifying, in the data, the data set representing a potential swing event,
upon identification of the potential swing event in the data, either:
generating a wake signal and sending the wake signal to a second processor of the swing detection system, or
causing the power domain controller to generate the wake signal and send the wake signal to the second processor;
by the second processor of the swing detection system:
changing from a sleep mode to a wake mode in response to receipt of the wake signal,
receiving the data set after the potential swing event is identified by the first processor, and
analyzing the data set to determine whether the data set corresponds to an actual swing event;
after determining that the data set corresponds to the actual swing event, determining whether a data transfer processor of the swing detection system is communicatively connected to an external system; and
if the data transfer processor is communicatively connected to the external system, transferring the data set to a location via which the data transfer processor may receive the data set for communication to the external system, otherwise saving a first copy of the data set to a non-volatile data storage device of the swing detection system.

* * * * *